US011080971B2

(12) United States Patent
Korolev et al.

(10) Patent No.: US 11,080,971 B2
(45) Date of Patent: Aug. 3, 2021

(54) METHODS, SYSTEMS, APPARATUS, AND ARTICLES OF MANUFACTURE TO GENERATE CORRECTED PROJECTION DATA FOR STORES

(71) Applicants: Konstantin Korolev, Moscow (RU); Gáspár Tamás Péter, Budapest (HU); The Nielsen Company (US), LLC, New York, NY (US)

(72) Inventors: Konstantin Korolev, Moscow (RU); Gáspár Tamás Péter, Budapest (HU)

(73) Assignee: The Nielsen Company (US), LLC, New York, NY (US)

( * ) Notice: Subject to any disclaimer, the term of this patent is extended or adjusted under 35 U.S.C. 154(b) by 256 days.

(21) Appl. No.: 16/071,396

(22) PCT Filed: Jun. 5, 2018

(86) PCT No.: PCT/RU2018/000368
§ 371 (c)(1),
(2) Date: Jul. 19, 2018

(87) PCT Pub. No.: WO2019/235954
PCT Pub. Date: Dec. 12, 2019

(65) Prior Publication Data
US 2019/0371133 A1    Dec. 5, 2019

(51) Int. Cl.
*G07G 1/00*    (2006.01)
*G06F 9/30*    (2018.01)
*G06Q 20/20*    (2012.01)

(52) U.S. Cl.
CPC ......... *G07G 1/0009* (2013.01); *G06Q 20/202* (2013.01)

(58) Field of Classification Search
CPC .................... G07G 1/0009; G06Q 20/202
See application file for complete search history.

(56) References Cited

U.S. PATENT DOCUMENTS

| 2010/0202698 | A1* | 8/2010 | Schmidtler | G06K 9/00442 |
| | | | | 382/195 |
| 2011/0145031 | A1* | 6/2011 | Basu | G06Q 10/103 |
| | | | | 705/7.13 |

(Continued)

OTHER PUBLICATIONS

International Searching Authority, "International Search Report and Written Opinion," issued in connection with International Patent Application No. PCT/RU2018/000368, dated Oct. 22, 2018, 14 pages.

*Primary Examiner* — Talia F Crawley
(74) *Attorney, Agent, or Firm* — Hanley, Flight & Zimmerman, LLC

(57) ABSTRACT

Methods, systems, apparatus, and articles of manufacture to generate corrected projection data for stores of a retailer are disclosed. An example apparatus to reduce projection errors associated with retail register devices includes a receipt data analyzer to retrieve transaction code values associated with receipts generated by the retail register devices, identify a direction change in a first subset of the retrieved transaction code values, and verify a register reset occurrence based on values associated with a second subset of the retrieved transaction code values, and a projection calculator to reduce retail sales projection error by calculating a transaction count based on the retrieved receipts and transaction code values.

24 Claims, 16 Drawing Sheets

(56) References Cited

U.S. PATENT DOCUMENTS

2013/0103462 A1    4/2013    Carpenter et al.
2013/0103578 A1*  4/2013    Mallean ................ G06Q 30/02
                                                                 705/39

* cited by examiner

METHODS, SYSTEMS, APPARATUS, AND ARTICLES OF MANUFACTURE TO GENERATE CORRECTED PROJECTION DATA FOR STORES

CROSS-REFERENCE TO RELATED APPLICATIONS

This patent arises from a 371 nationalization of International Patent Application Serial No. PCT/RU2018/000368, which is entitled "METHODS, SYSTEMS, APPARATUS, AND ARTICLES OF MANUFACTURE TO GENERATE CORRECTED PROJECTION DATA FOR STORES," and which was filed on Jun. 5, 2018, the subject matter of which is incorporated herein by reference in its entirety.

FIELD OF THE DISCLOSURE

This disclosure relates generally to store registers and, more particularly, to methods, systems, apparatus, and articles of manufacture to generate projection data for stores.

BACKGROUND

Data measurement companies typically utilize different types of data to provide information needed by their clients, such as reporting data, panelist data, retail data, etc. Such data provides insight to consumer behavior and/or competitor activity, which enables a client (e.g., a retailer) of a data measurement company to effectively market to consumers and/or manage business operations. Conventional projection systems rely on computational resources and, in recent years, have become more complex.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
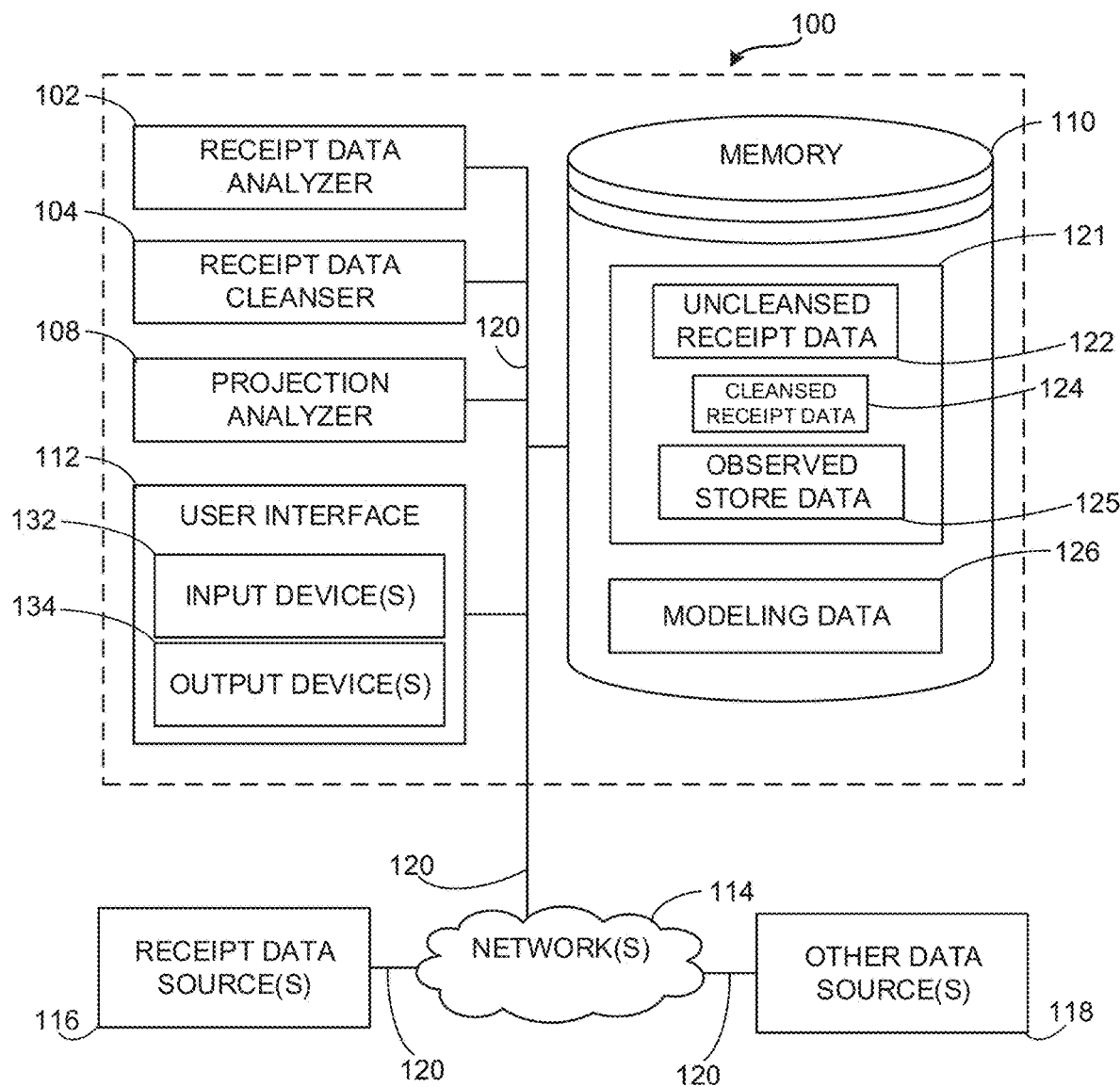
FIG. 1 is a block diagram of an example projection calculator in accordance with the teachings of this disclosure.

Recent technology advances in computer architecture have enabled the development of technologies related to the technical field of market research and analytics. Generally speaking, market researchers may perform statistical analyses based on customer purchase behavior at stores of a retailer, for example, to determine marketing effectiveness, consumer behavior, and/or store activity. However, known projection systems in this technical field of market research and analytics may not have access to such data for a particular retailer, may have insufficient retailer data to satisfy statistical projection accuracy, or some retailers may not cooperate with market research efforts (e.g., refusal to share shopping/sales data). Such data deficiency impedes or prevents these known projection systems from effectively generating accurate and/or useful estimates of customer activity for the retailer such as a total number of customer transactions, total product sales, etc.

Some known projection systems estimate customer activity that occurred at a store by using crowd-sourced data such as, for example, transaction codes that are printed on receipts or cash slips by register devices (sometimes referred to as cash registers or tills) in the store. As used herein, the terms "transaction code" and/or "receipt transaction code" refer(s) to one or more numbers, letters, and/or characters provided on a receipt or cash slip by retail register device. As used herein, the terms "register device," "till," "retail register device," and/or "cash register" refer(s) to an electronic device in a store that facilitates transactions between customers and a store. However, a known projection system may provide inaccurate estimations due to a retail register system (sometimes referred to as a point-of-sale POS system) associated with the store and/or one or more register devices in the store.

For example, the register system of the store may generate transaction code sequences for receipts in accordance with one or more particular patterns, which may not be accounted for by these known projection systems. In particular, after each purchase made by a customer, the register system increases or expands a transaction code sequence by a particular increment (e.g., 1, 2, 3, etc.), which, for some register systems, is based on a payment type or method (e.g., cash, credit, debit, etc.) used by a customer. Further, some types of retail register systems are responsive to transactions made at a single register device, and other types of retail register systems are responsive to transactions made at multiple registers devices. Further still, such register systems eventually reset a transaction code sequence for various reasons, as discussed further below.

Some known projection systems obtain the transaction code sequences from customers that shop at stores of a retailer. In particular, the customers may capture images of receipts or cash slips via cameras and/or electronic devices (e.g., smartphones) that are subsequently processed and/or transcribed. However, receipt data obtained in this manner is prone to errors, for example, due to poor image quality of the receipts and/or image processing (e.g., related to optical character recognition (OCR)). Further, receipt data obtained in this manner may not properly represent all stores of a retailer, which skews projection data for the retailer that is generated based on such receipt data. In particular, over time, receipts from some of the stores (e.g., small stores such as convenience stores) may be obtained in higher quantities and/or more frequently than the other stores (e.g., larger stores such as supermarkets).

As a result of such register system biases and/or erroneous receipt data, the above mentioned known projection systems generate inaccurate and/or erroneous projection data (e.g., skewed customer transactions, skewed product sales, etc.) for stores of the retailer. Accordingly, clients of a data measurement company that rely on these known projection systems are adversely affected by inaccurate and/or erroneous projection data. Additionally, to correct for these errors, the known projection systems endure computationally intensive re-calculation of the projection data to satisfy a standard or threshold of error, which reduces computational efficiency of these known projection systems. Further, these known projection systems may require additional or supplemental data to aid in the re-calculation of the projection data.

Methods, systems, apparatus, and articles of manufacture to generate corrected projection data for stores of a retailer are disclosed herein as improvements to the technical field of market research and analytics. Examples disclosed herein calculate improved metric(s) related to numbers of predicted or projected customer transactions that occurred at the stores during a target time interval (e.g., a week) based on receipt data (e.g., transaction codes, store codes, register codes, timestamps, etc.) provided on receipts or cash slips from the respective stores. Stated differently, based on the receipt data, disclosed examples calculate a quantity of customers that made or likely made purchases at the stores of the retailer during the target time interval. In particular, disclosed examples generate such projection data by identifying and correcting for patterns in transaction code sequences associated with one or more respective retail register systems of the stores, thereby reducing and/or eliminating the above noted projection errors and/or bias associated with the above mentioned known projection systems. To illustrate, if store receipts are collected for a day in which a temporally earliest receipt includes a transaction count value of "0000" and a temporally latest receipt includes a transaction count value of "1999," then a candidate transaction count for that store would indicate approximately 2000 transactions in that day. However, if the register transaction counter increments by a single integer for cash transactions and increments by an integer value of two for credit card transactions, then the candidate transaction count value of 2000 would be erroneously high (assuming at least one transaction purchase was made using a credit card). As a result, examples disclosed herein permit clients of a data measurement company to receive projection data having an improved accuracy and/or otherwise reduced error, which enables the clients to effectively market to consumers, manage business operations, etc.

As will be discussed in greater detail below in connection with FIGS. 1, 2A, 2B, 3, 4A, 4B, and 5-16, disclosed examples provide an example projection calculator 100 to obtain (e.g., electronically) receipt data (e.g., transaction codes, store codes, timestamps, etc.) from receipts via customers that made purchases at the stores. Based on such receipt data, the example projection calculator identifies one or more sequence characteristics that predictably affect the transaction code sequences and/or the resulting projection data. As discussed further below, these sequence characteristics are indicative of factors (sometimes referred to as correction factors) that are sufficient to effectively correct for the patterns associated with the respective register system(s) such as, for example, adjusted or incremented differences between transaction codes and/or timestamps. Accordingly, the disclosed example projection calculator calculates one or more adjusted transaction counts based on the identified sequence characteristics associated with respective ones of the transaction code sequences to facilitate calculating the projection data for the retailer. In this manner, disclosed examples account and correct for biases associated with the retail register system(s) that would likely skew the projection data for the retailer.

In some examples, the disclosed projection calculator identifies and corrects for sequence reset instances in respective ones of the transaction code sequences that result from, for example, a change in cashier of a register device or cash register, a particular time interval (e.g., a day, a week, etc.), and/or a particular transaction code limit (e.g., 9,999). In some examples, the projection calculator identifies and corrects for business or operating hours of the stores that predictably affect the respective transaction code sequences. In some examples, the projection calculator identifies and corrects for one or more increment value(s) (e.g., 1, 2, 3, etc.) by which the transaction codes are altered by a register system after each customer purchase. In some examples, such increment value(s) are based on payment type or method (e.g., cash, credit, debit, etc.) used by customers in-store. For example, a cash purchase transaction causes a register system to increment by a first integer value (e.g., 1), while a credit-card transaction causes the register system to increment by a second integer value (e.g., 2). As used herein, cash transactions are sometimes referred to as "purchase transactions," while non-cash transactions are sometimes referred to as "technical transactions." Technical transactions include, but are not limited to debit card transactions, credit card transactions, near-field-communication (NFC) transactions (e.g., Google Pay®), etc. Some disclosed examples identify the increment value(s) by validating a register system, as discussed further below in connection with FIGS. 2A, 2B, and 7.

Some disclosed examples identify and correct for one or more stores of interest and/or one or more register devices of interest that have insufficient receipt data associated therewith, which may skew the projection data. For example, a store of interest and/or a register device of interest is associated with less than two receipts or, in some examples, two receipts having timestamps that are proximate (e.g. occurring on the same day), for the target time interval. In particular, example projection calculators disclosed herein obtain historical receipt data and/or historical trends for the store of interest and/or the register device of interest that corresponds to a time outside of the target time interval, but not outside of an investigation time interval (e.g., up to about 3 months), to supplement receipt data when calculating the projection data for the retailer. As used herein, the example investigation time interval represents a period of time in which historical behavior/purchase data is used for projections when current data is sparse or unavailable. Generally speaking, behavior and/or purchasing trends within a relatively short period of time are expected to be more consistent with current behavior and/or purchasing behavior as compared to observations made at a relatively longer period of time. Additionally, in some examples, the projection calculator performs a statistical analysis to determine whether one or more register devices of interest was inactive during the target time interval, which is discussed further below in connection with FIGS. 12-13. In such examples, the projection calculator accounts for identified inactive register device(s) when generating the projection data such that the inactive register device(s) does/do not skew the projection data.

Some disclosed examples identify and correct for inconsistencies in observed activity associated with the stores of retailer, which may similarly skew the projection data for the retailer. In some examples, based on the receipt data corresponding to the target time interval, the disclosed projection calculator determines a projected quantity of customers that made purchases at each store and/or each register device, for example, via interpolation and/or extrapolation. In such examples, to identify unreliable or inconsistent receipt data that is associated with a store of interest and/or a register device of interest, the projection calculator compares the projected quantity of customers to observed historical data (e.g., historical receipt data, historical projection data, and/or historical trends in customer activity) associated with the same store of interest and/or register device of interest and/or to one or more other stores and/or register devices of the retailer. In particular, to correct for such unreliable or inconsistent receipt data, the projection calculator uses the historical data to calculate a historical quantity of projected customers associated with the store of interest and/or the register device of interest to aid in calculating the projection data for the retailer.

Some inconsistencies result from varying quantities of receipt data obtained for each store of the retailer. For example, the disclosed projection calculator receives receipt data corresponding to some stores (e.g., smaller traffic stores such as convenience stores) of the retailer less frequently and/or in smaller quantities relative to some other stores (e.g., larger traffic stores such as supermarkets) of the retailer, which may skew the projection data for the retailer. In such examples, the disclosed projection calculator accounts and/or corrects for such a bias, for example, via ratio estimation. In particular, the projection calculator identifies stores associated with receipt data insufficient to use in calculating the projection data for the retailer and, in response, determines a correction factor to account for such a bias.

Some disclosed examples cleanse the receipt data to identify and correct for errors therein (e.g., associated with OCR processing for receipts or cash slips). In particular, the disclosed projection calculator identifies at least a portion of the receipt data in a memory that is erroneous and, in response, removes and/or deletes the portion of the receipt data in the memory. As a result of such cleansing of the receipt data, the example projection calculator calculates improved projection data (e.g., more accurate transaction count estimations) for the retailer while using less of the receipt data (e.g., by using less memory) that would have otherwise been used in the calculation. Further, examples disclosed herein increase processing efficiency of the disclosed projection calculator by reducing a number of calculations sufficient to provide the projection data for the retailer.

In some examples, the disclosed projection calculator identifies and removes invalid and/or erred receipt data such as duplicated transaction codes, duplicated timestamps, etc. Some disclosed examples calculate characteristics (e.g., a customer velocity) for the receipt data to facilitate the identification of invalid and/or erred data, as discussed further in connection with FIG. 8. For example, the projection calculator identifies transaction codes in a transaction code sequence that are statistical outliers relative to other transaction codes in the same transaction code sequence.

Figure 11:
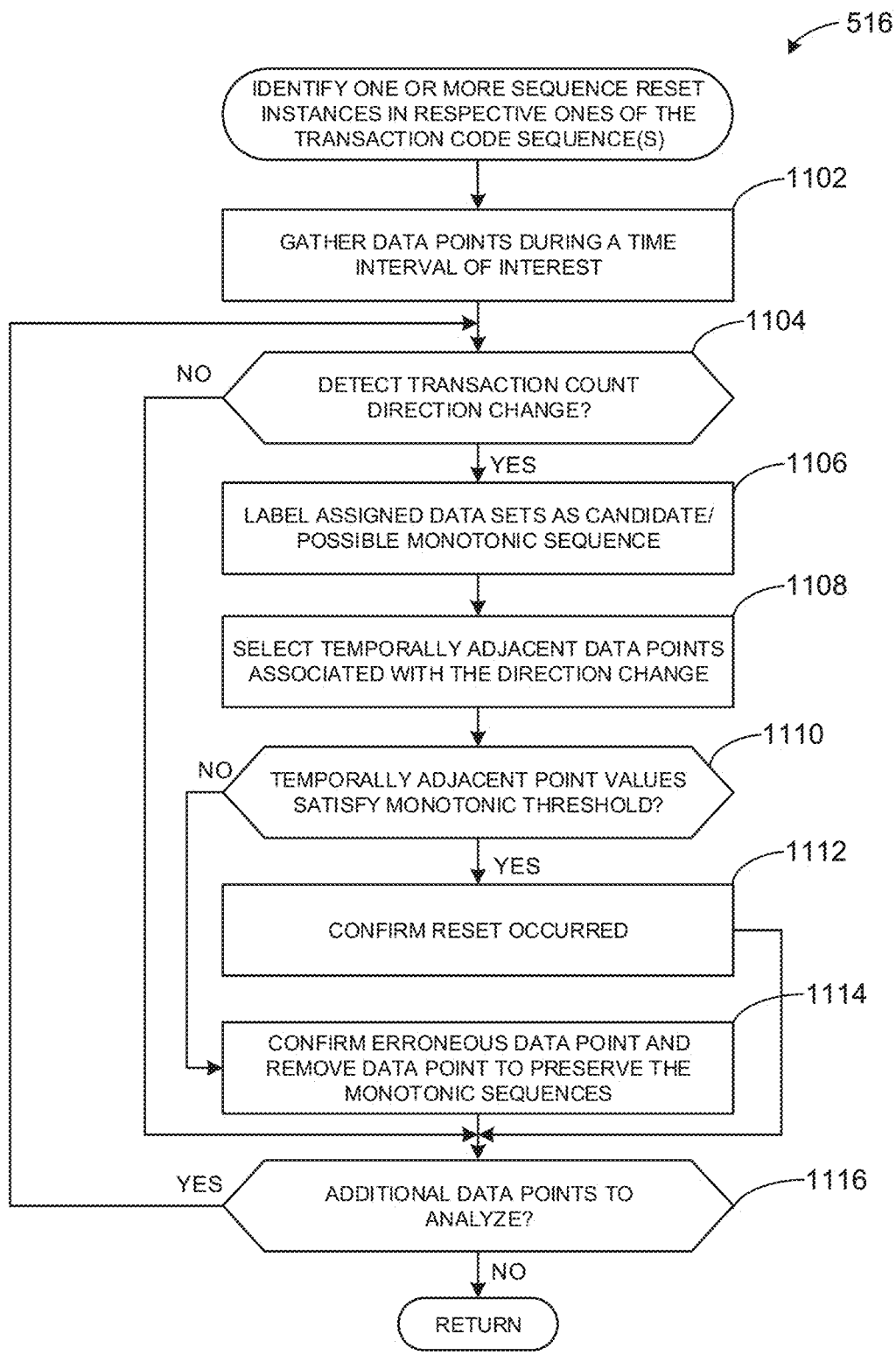
FIG. 11 is a flowchart representative of example machine-readable instructions that may be executed to implement the example projection calculator of FIG. 1 to identify example transaction count reset instances.

Some disclosed examples cleanse the receipt data based on monotonic characteristics of receipt data, which may be referred to herein as monotonic cleansing, as discussed further in connection with FIG. 11. In some such examples, based on the receipt data, the disclosed projection calculator identifies a number of monotonic sequences of transaction codes associated with a retail register system. As used herein, the term "monotonic sequence" refers to a sequence (e.g., a sequence of receipt transaction codes) in which each consecutive (e.g., subsequent) value is greater than a previous value in the sequence (e.g., a sequence value for a register increments by an integer quantity in response to each successive purchase instance at that register). In particular, the projection calculator identifies a transaction code that, when removed from a corresponding monotonic sequence, reduces the number of monotonic sequences over a target period of time. Stated differently, two monotonic sequences become a single monotonic sequence by removing such a transaction code (e.g., removing an erroneous transaction code). In such examples, to implement monotonic cleansing for the receipt data stored in the memory, the projection calculator analyzes a time interval within which a transaction code sequence (e.g., including one or more monotonic sequences) reset or likely reset only once.

To illustrate, example Table 1 includes a series of transaction codes from eight receipts for a register of interest

TABLE 1

| Receipt Timestamp | Transaction Code Value |
| --- | --- |
| t1 | 001 |
| t2 | 012 |
| t3 | 023 |
| t4 | 024 |
| t5 | 007 |
| t6 | 029 |
| t7 | 031 |
| t9 | 033 |

In the illustrated example of Table 1, receipts occurring at time t1 through t4 include transaction code values that increase in value, thereby forming a monotonic sequence. However, the example receipt occurring at t5 includes a value of 007, which may indicate a possible break in the example monotonic sequence that started at time t1. One possibility is that the receipt at time t5 is valid and suggests that the register of interest has reset its counter. One alternate possibility is that the receipt at time t5 is erroneous (e.g., the value 007 is an OCR error that should have been 027). In the event the erroneous receipt at time t5 is removed, then a corrected monotonic sequence includes receipts at time t1 through t4, and t6 through t9 (after removing the erroneous receipt occurring at time t5). Stated differently, two separate monotonic sequences have been merged into a single monotonic sequence after the removal of the erroneous receipt.

Such monotonic cleansing improves transaction count accuracy. Returning to the illustrated example of Table 1, if the two separate monotonic sequences were taken as true, then also assume that the register associated with the receipt data of Table 1 has a maximum counter value of 999. The first example monotonic sequence of t1 through t4 indicates that at least twenty-four (24) transactions have occurred. The receipt data at time t5 (having a transaction count value of seven (7)), if assumed to be valid, would suggest that the register completed an additional 982 transactions (i.e., the register transaction counter maximum value minus the twenty-four (24) previously identified transactions, plus an additional seven (7) transactions). However, because examples disclosed herein verify whether a possible reset occurrence is valid, such excessive overestimations of transactions are avoided. Stated differently, examples disclosed herein verify that the data associated with the receipt at time t5 is erroneous, which establishes a transaction count total value of thirty-three (33) rather than 982.

Some disclosed examples cleanse the receipt data based on one or more days of interest (e.g., a threshold number of days) in the target time interval during which one or more (e.g., all) of the stores of the retailer were closed unexpectedly (e.g., closed during normal business hours), for example, due to a national holiday, a weather anomaly, etc. In some examples, the disclosed projection calculator performs a statistical analysis to determine whether the store(s) of the retailer were closed unexpectedly. In such examples, the projection calculator identifies a portion of the receipt data corresponding to the day(s) of interest and, in response, removes the portion of the receipt data from the memory.

Some disclosed examples cleanse the receipt data based on fraudulent customer activity. For example, customers may produce and/or provide fraudulent images of receipts and/or receipt data to the disclosed projection calculator (e.g., to receive incentives from a data measurement company). In some examples, the disclosed projection calculator performs a statistical analysis to determine whether a portion of the receipt data in the memory is fraudulent and, in response, removes the portion of the receipt data from the memory.

FIG. 1 is a block diagram of an example projection calculator 100 in accordance with the teachings of this disclosure. In the illustrated example of FIG. 1, the example projection calculator 100 includes an example receipt data analyzer 102, an example receipt data cleanser 104, an example projection analyzer 108, an example memory 110, and an example user interface 112. In some examples, the example projection calculator 100 also includes one or more example network(s) 114 (e.g., an intranet, the Internet, a wide area network (WAN), cloud-computing resources, etc.), one or more example receipt data sources 116, and/or one or more example other data sources 118. To facilitate generating projection data for a store (e.g., a number of customer transactions that occurred or likely occurred at the store during a target time interval), the projection calculator 100 analyzes and/or processes data 121 stored in the memory 110. In particular, the memory 110 includes uncleansed retail receipt data 122 and/or cleansed retail receipt data 124 corresponding to cash slips or receipts (e.g., see the example receipt 300 depicted in connection with FIG. 3) generated by one or more register devices 206, 214, 216 and/or one or more register systems 202, 210 (shown in FIG. 2). The example memory 110 also includes an observed data store 125, which may include historical data. In the illustrated example of FIG. 1, the receipt data analyzer 102 implements a means for analyzing data (also referred to herein as a data analyzing means), the projection calculator 100 implements a means for calculating a projection (also referred to herein as a projection calculating means), and the receipt data cleanser 104 implements a means for receipt data cleaning (also referred to herein as a receipt data cleaning means). The example data analyzing means, the example projection calculating means and the example receipt data cleaning means of examples disclosed herein is/are implemented by software executing on a hardware processor. Although it/they could instead be implemented by a logic circuit structured to perform logic operations to achieve the desired functionality, such as an ASIC, an FPGA or the like and/or a combination of such circuits and software and/or firmware.

According to the illustrated example of FIG. 1, the projection calculator 100 includes one or more communication links (e.g., one or more signal transmission wires or busses, radio frequency, etc.) 120 to facilitate communication internally and/or externally. For example, the projection calculator 100 is communicatively coupled to the network(s) 114 via the communication link(s) 120 to receive data from and/or provide data to the network(s) 114. In some examples, the network(s) 114 include, but are not limited to, the Internet, one or more virtual private networks (VPNs), one or more local-area networks (LAN), one or more wide-area networks (WANs), busses, cloud-based network (s), etc.

The projection analyzer 108 of FIG. 1 is communicatively coupled to the memory 110 via the communication link(s) 120 to access and/or store data. In particular, the projection analyzer 108 utilizes at least a portion of the receipt data 122, 124 and modeling data 126 to calculate a potential or predicted transaction count (i.e., a number of transactions) between customers and one or more stores of a retailer that occurred or likely occurred during an example target time interval (e.g., a week).

In some examples, prior to calculating the potential or predicted and/or otherwise corrected transaction count, the projection analyzer 108 calculates one or more correction factors based on one or more sequence characteristics (e.g., identified by the receipt data analyzer 102) associated with the receipt data 122, 124 that, if unaccounted for, may skew the projection data for the retailer. The projection analyzer 108 then applies the correction factor(s) in calculating the projected transaction count, thereby providing a corrected or improved transaction count for the retailer. In this manner, the projection calculator 100 increases accuracy of the projection data for the retailer.

An example correction factor includes an adjusted difference between the acquired receipt data 122, 124 (e.g., between consecutive times stamps and/or transaction codes) and a reported number of transactions occurring at a retail location (e.g., a store) of interest and/or a set of retail locations within a geography of interest. In some examples, correction factors (e.g., multiplier values) account and/or correct for observed business hours of the stores and/or sequence reset instances (e.g., patterns) associated with a retail register system. In another example, an example correction factor includes a ratio or proportion that corresponds to a quantity of customers that used or likely used a certain payment type (e.g., credit) in making purchases during a target time interval, which, in some examples, accounts and/or corrects for one or more additional patterns associated with the retail register system. For instance, some register systems will increment a transaction sequence count by an integer value of one when the transaction is associated with a cash payment. However, some register systems will increment the transaction sequence count by an integer value of three when the transaction is associated with a credit card payment. In yet another example, a correction factor includes historical observed data (e.g., observed receipt data, observed projection data, and/or observed trends in customer activity) associated with the retailer that is outside of a target time interval but within an investigation time interval. In yet another example, an example correction factor includes a ratio or proportion that corresponds to a characteristic (e.g., a size relative to other stores of the retailer) of one or more stores (e.g., a set or group of stores) that were not used in calculating the projection data for the retailer, which sometimes referred to as ratio estimation.

In some examples, to facilitate identification of a register device that was inactive or likely inactive during a target time interval, the projection analyzer 108 uses the modeling data 126 to calculate a probability value or likelihood value (e.g., a proportion or percentage) based on a number of receipts associated with the register device. In particular, the projection analyzer 108 performs one or more statistical tests and/or hypotheses to determine the probability, for example, via one or more equations, models, algorithms, and/or methods or techniques related to the Poisson distribution. In such examples, the projection analyzer 108 calculates a probability threshold (e.g., about 30%) indicative of a register device being inactive. The projection analyzer 108 then performs a comparison of the probability to the threshold probability value, which indicates whether the register device was inactive during the target time interval. In some examples, if the register is determined to be inactive (e.g., due to mechanical, electrical issues), the projection analyzer 108 calculates a correction factor for one or more other registers of the retail location that would compensate (e.g., "bump-up" values for the one or more other registers) for the inactive register.

The example receipt data analyzer 102 of FIG. 1 is communicatively coupled to the memory 110 via the communication link(s) 120. In particular, the receipt data analyzer 102 analyzes and/or processes at least a portion of the receipt data 122, 124 stored in the memory 110 to facilitate interpretation and/or generation of the projection data for the retailer.

Figure 3:
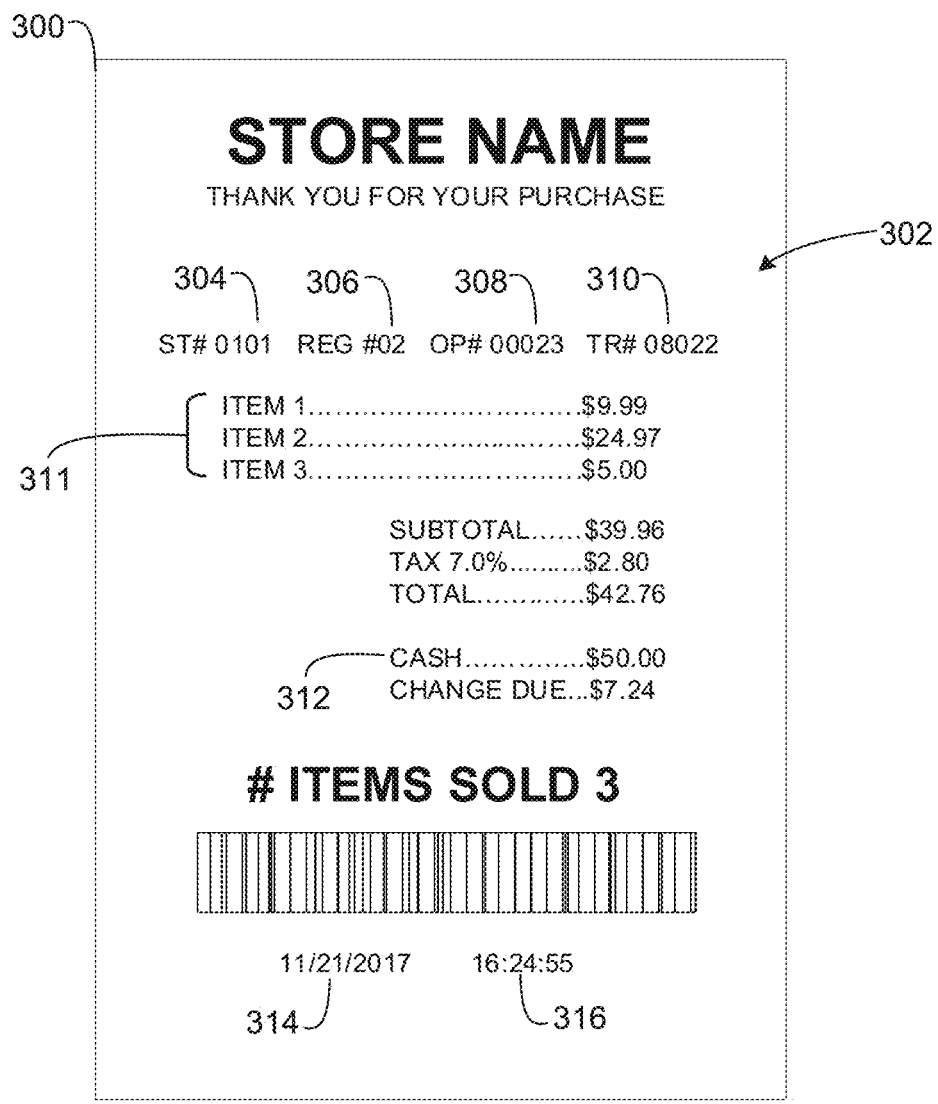
FIG. 3 illustrates an example retail receipt in accordance with the teachings of this disclosure.

In some examples, the receipt data analyzer 102 generates at least some of the receipt data 122, 124 based on images of receipts or cash slips (e.g., see the example receipt 300 depicted in connection with FIG. 3) provided to the projection calculator 100 by one or more customers, for example, via one or more processes, methods, and/or techniques related to OCR. In other examples, the customers provide at least some of the receipt data 122, 124 to the projection calculator 100. In still other examples, receipt data (e.g., uncleansed/raw receipt data 122, cleansed receipt data 124) is acquired and/or otherwise provided by third-party data aggregation services.

In some examples, the receipt data analyzer 102 generates groups for different portions of the receipt data 122, 124 based on stores in which corresponding customer transactions occurred, register systems that generated the receipt data 122, 124, and/or register devices that generated corresponding receipts or cash slips. In some such examples, the receipt data analyzer 102 sorts the receipt data 122, 124 in each group based on one or more of dates (e.g., a day, a month, and/or a year) when the receipt data 122, 124 was generated, times (e.g., a second, a minute, and/or an hour of a day) when the receipt data 122, 124 was generated, and/or transaction codes of the receipt data 122, 124, for example, see the example first graph 400 and/or the example second graph 401 depicted in connection with FIGS. 4A and 4B, as described in further detail below.

Figure 2A:
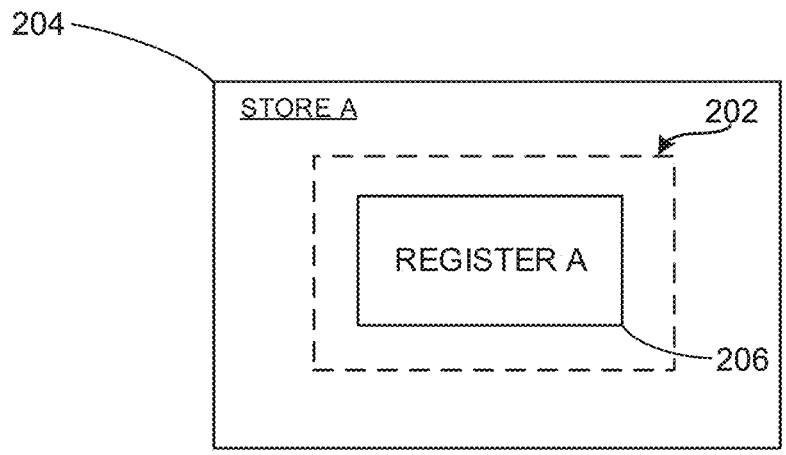
FIGS. 2A and 2B are block diagrams illustrating example retail register systems in accordance with disclosed examples.
Figure 2B:
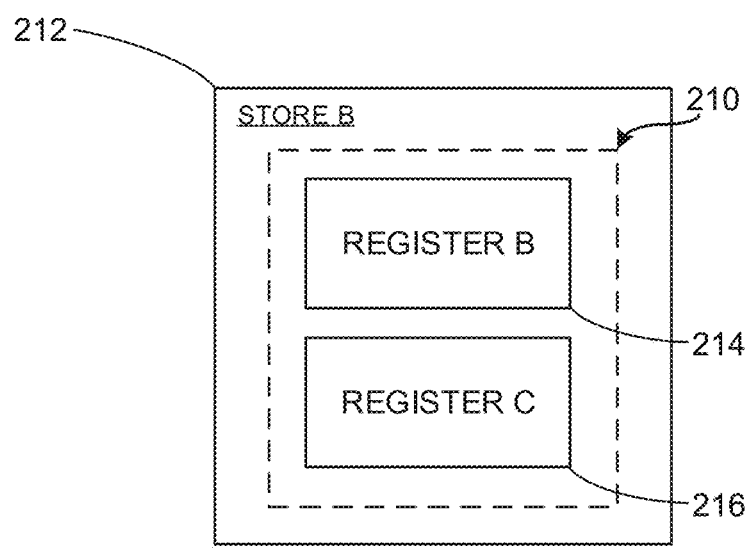
Figure 4A:
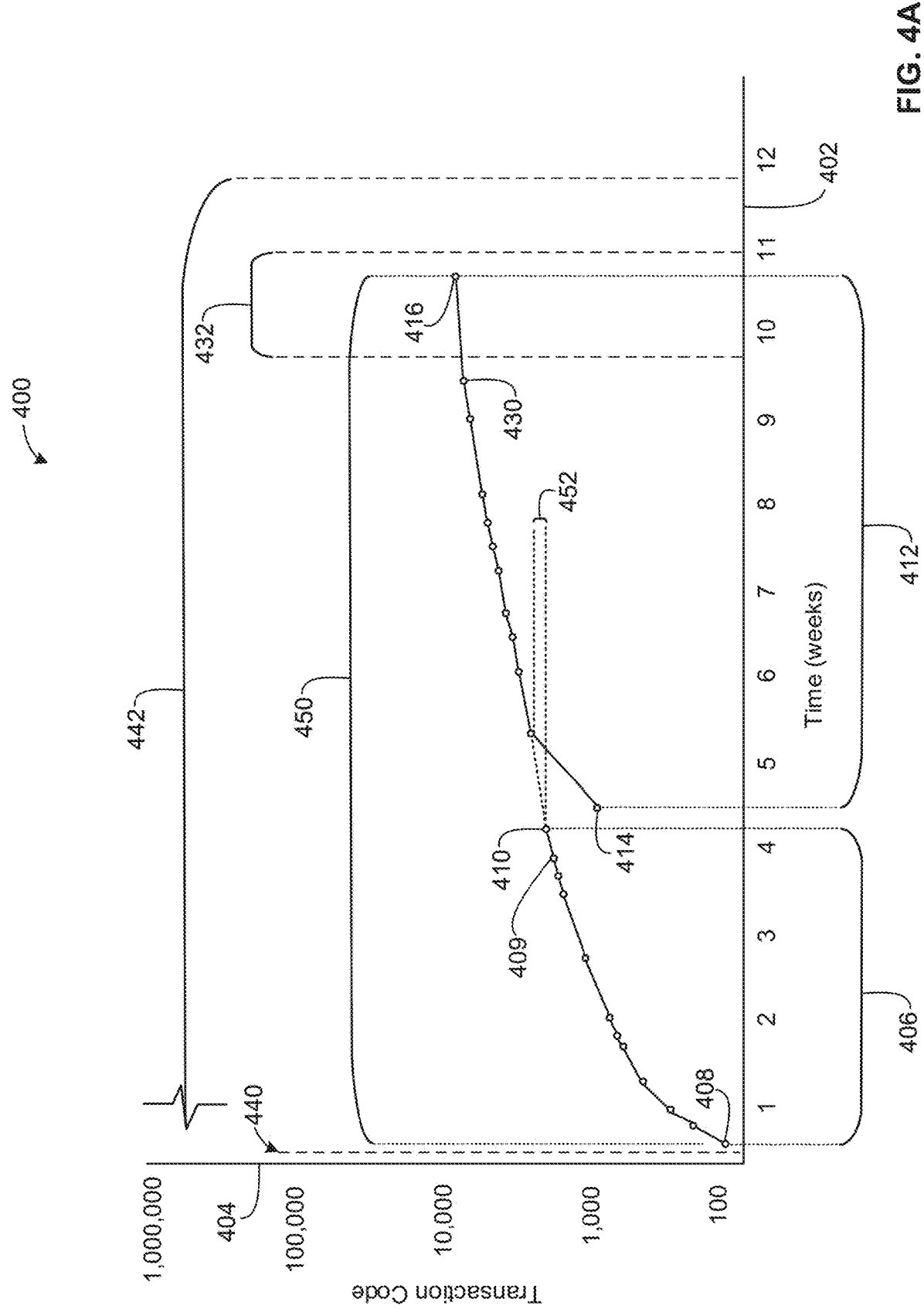
FIGS. 4A and 4B show example graphs illustrating example retail receipt data in accordance with disclosed examples.
Figure 4B:
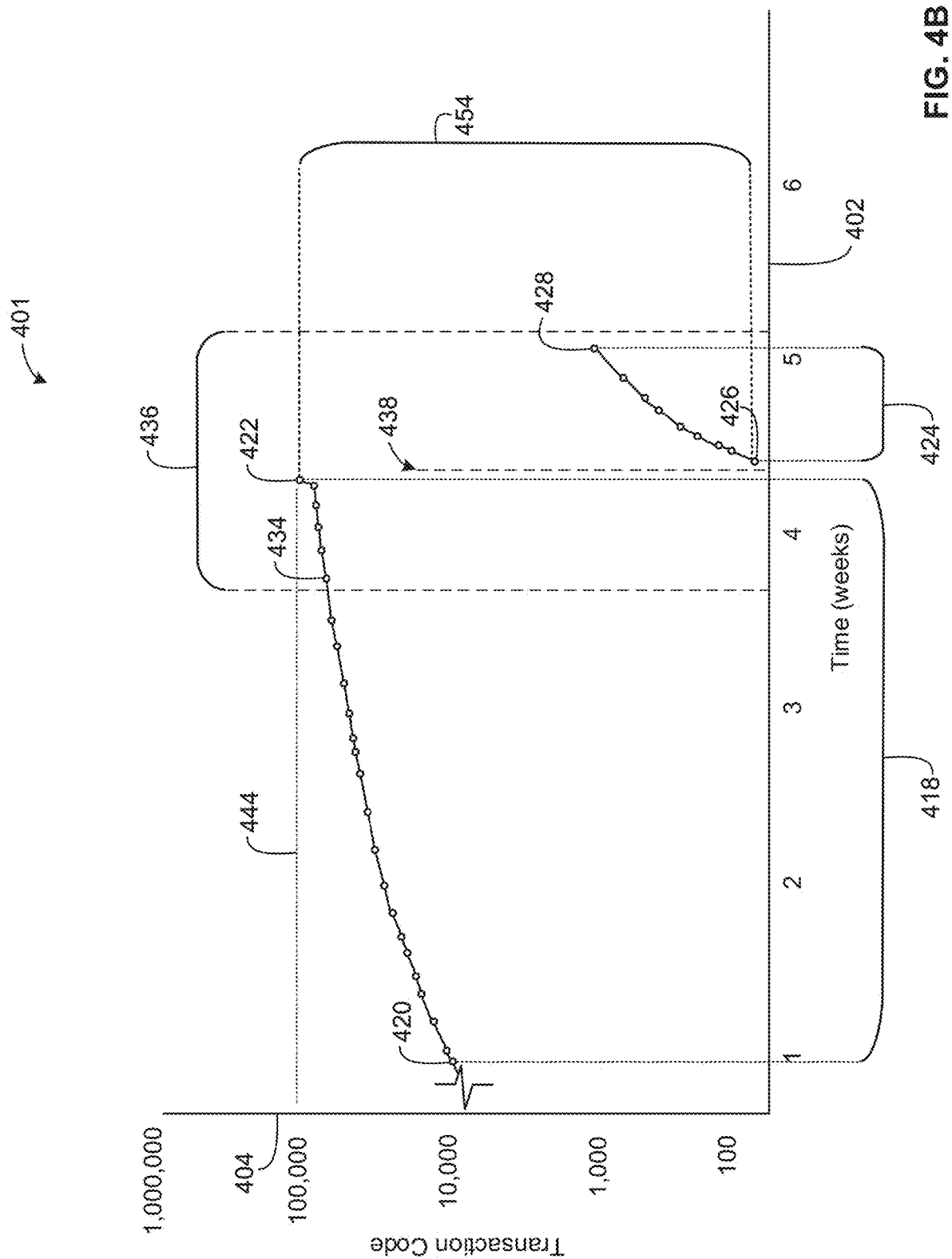

In some examples, the receipt data analyzer 102 identifies transaction code sequences (e.g., see the example sequences 406, 412 and the example sequences 418, 424 depicted in connection with FIGS. 4A and 4B) associated with respective retail register systems (e.g., see the example first retail register system 202 and the example second retail register system 210 depicted in connection with FIGS. 2A and 2B). In such examples, based on data points forming and/or defining the transaction code sequences, the receipt data analyzer 102 identifies one or more sequence characteristics for respective ones of the transaction code sequences, which enables the projection analyzer 108 to calculate one or more of the disclosed correction factors.

In some examples, the receipt data analyzer 102 identifies reset instances (e.g., see the example first reset instances 438 and/or the example second reset instance 440) in the respective transaction code sequences. As used herein, a reset, a register reset and/or reset instances refer to register transaction count values reaching a maximum count value and then returning to an initial value (e.g., zero). For instance, some register devices print a transaction count value on each receipt that is provided to a customer. Some register devices implement transaction count fields having any number of digits, such as a four-digit transaction count field that spans from an initial value of 0000 and a maximum value of 9999. For example, based on cashier or operator codes (e.g., see the example operator code 308 depicted in connection with FIG. 3) in the receipt data 122, 124, the receipt data analyzer 102 identifies a reset instance resulting from a change in cashiers or operators of a register device. In another example, based on values of transaction codes (e.g., see the example transaction code or count 310 depicted in connection with FIG. 3) in the receipt data 122, 124, the receipt data analyzer 102 identifies a reset instance resulting from a sequence limit associated with a retailer register system. Such reset instances may be specific to a type of retail register device and/or retail register system. For example, some register devices and/or systems reset a transaction count after reaching a particular transaction code (e.g., an integer such as 9,999, 99,999, etc.). Reset instances also illustrate a break in a monotonic sequence.

In some examples, the receipt data analyzer 102 validates at least some of the receipt data 122, 124 to facilitate generation of the projection data as well as identification of sequence characteristics associated with the receipt data 122, 124, which is discussed further below in connection with FIGS. 2A, 2B, and 7. In particular, a portion of the data 122, 124 that is considered to be validated is kept and/or maintained for use in projection data calculations. On the other hand, a portion of the data 122, 124 that is considered to be non-validated and/or invalid is not used in the projection data calculations. In such examples, in response to performing validation of the receipt data 122, 124, the receipt data analyzer 102 identifies one or more of particular increments (e.g., 1, 2, 3, etc.) by which a retail register system generates a transaction code sequence for receipts or cash slips, a type of the retail register system, and/or when reset instances occur or are likely to occur. Further, in such examples, the receipt data analyzer 102 identifies types of retail register systems used by the respective stores and/or which stores use the same retail register system In some examples, based on the store codes (e.g., see the example store code 304 depicted in connection with FIG. 3) in the receipt data 122, 124, the receipt data analyzer 102 identifies a number of stores of the retailer (e.g., a total number of stores). In some examples, based on register codes (e.g., see the example register code 306 depicted in connection with FIG. 3) in the receipt data 122, 124, the receipt data analyzer 102 identifies a number of register devices at the respective stores of the retailer (e.g., a total number of register devices).

In some examples, the receipt data analyzer 102 identifies one or more register devices of interest associated with a portion of the receipt data 122, 124 that is insufficient for a target time interval. In such examples, an example register device of interest is considered to have insufficient receipt transaction codes associated therewith for the target time interval. In some examples, a register of interest is considered to have only two receipt transaction codes associated therewith that are proximate to each other (e.g., occurring within the same day). Such proximate data points are not reliable and/or do not accurately represent customer activity associated with a store and/or a register device and, as a result, skew projection data when used in related calculations. For example, a store may have irregular customer traffic (e.g., significantly large or small quantities of customers) occurring on a single day in a week compared to other days in the week. In circumstances where insufficient, erratic, and/or otherwise inconclusive (e.g., no receipt at/near the time of retail opening, no receipt at/near the time of retail closing hours, receipts in close temporal proximity insufficient to illustrate purchase trend/rate information), the example projection analyzer 108 retrieves historical data (e.g., from the example observed store data 125) for estimation purposes.

In some examples, the receipt data analyzer 102 similarly identifies one or more stores of interest associated with a portion of the receipt data 122, 124 that is insufficient for a target time interval. In such examples, an example store of interest is considered to have a certain proportion (e.g., a threshold of approximately 75% or more) of register devices of interest. For example, if a store of interest has ten register devices, eight or more of them must have receipt data associated therewith for the retail location to be considered in calculating correction factors.

The receipt data cleanser 104 of FIG. 1 is communicatively coupled to the memory 110 via the communication link(s) 120. In particular, the receipt data cleanser 104 analyzes and/or processes at least a portion of the uncleansed receipt data 122 stored in the memory 110 to facilitate the removal and/or deletion of erroneous and/or invalid data, thereby providing the cleansed receipt data 124, as discussed in connection with FIGS. 8-11. That is, in some examples, at least some of the uncleansed receipt data 122 may be erroneous and/or invalid due to, for example, OCR errors, inadequate images of receipts or cash slips provided by customers, and/or fraudulent customer activity. As a result of cleansing the receipt data 122, 124, the example projection calculator 100 is enabled to calculate improved projection data (e.g., correction factors) for the retailer by using less of the receipt data 122, 124 (i.e., by using less memory). Further, processing efficiency of the projection calculator 100 is improved as a result of cleansing the receipt data 122, 124.

In some examples, the receipt data cleanser 104 removes duplicated portions of the uncleansed receipt data 122 such as duplicated transaction codes, duplicated timestamps, etc. In some examples, the receipt data cleanser 104 removes invalid portions of the uncleansed receipt data 122 such as invalid dates (e.g., 2/30/2018, 13/1/2018, etc.). Further, in some examples, the receipt data cleanser 104 cleanses the uncleansed receipt data 122 and/or further cleanses the cleansed receipt data 124 based on sequence parameters, sequence characteristics, unexpected closure of the retailer, and/or fraudulent customer activity, as identified by the receipt data analyzer 102.

Figure 8:
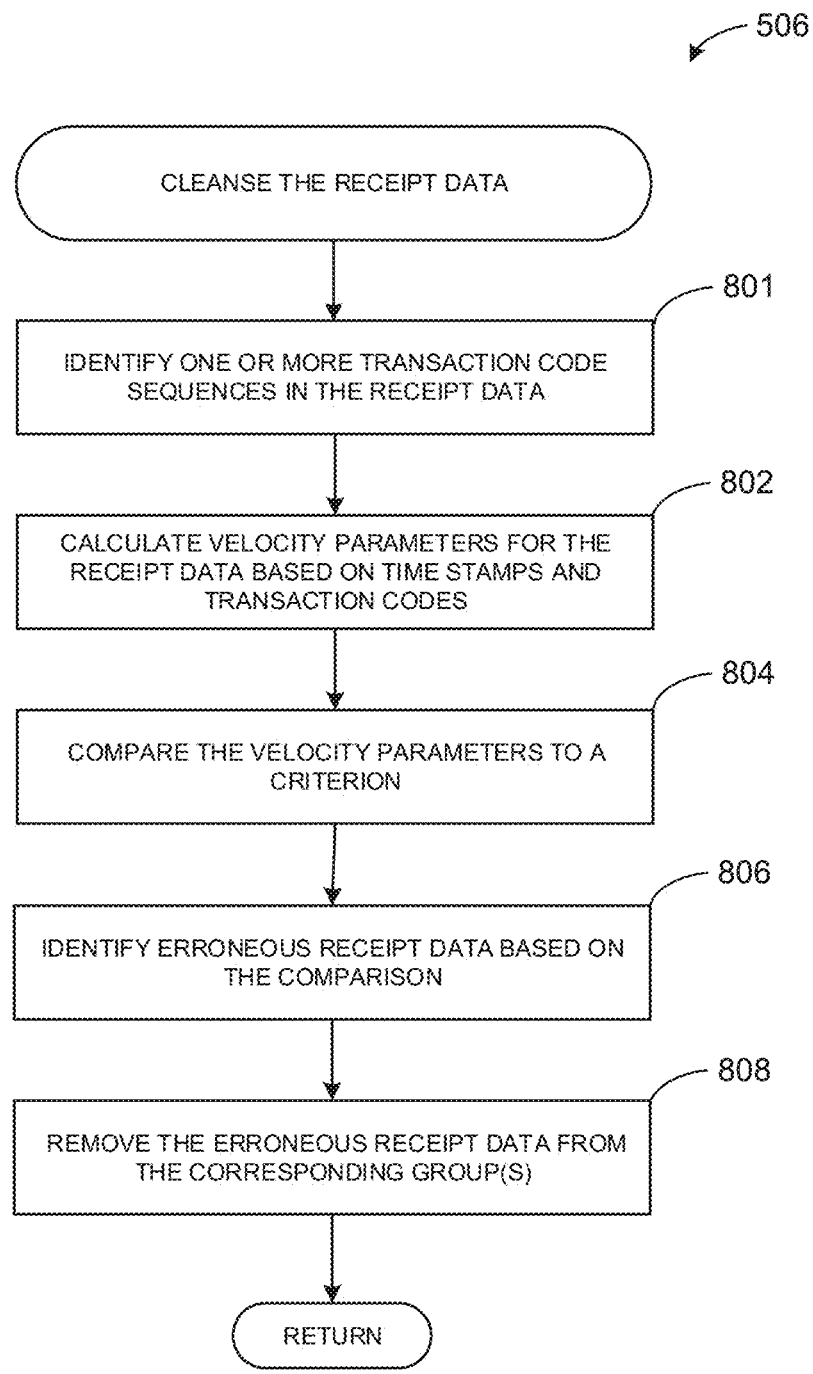
FIGS. 8-10 are flowcharts representative of example machine-readable instructions that may be executed to implement the example projection calculator of FIG. 1 to cleanse retail receipt data.

In some examples, the receipt data cleanser 104 calculates one or more sequence parameters and/or sequence characteristics (e.g., customer velocities) for the receipt data 122, 124 to facilitate the identification of erroneous and/or invalid data, as discussed further in connection with FIG. 8. In such examples, based on the modeling data 125, the receipt data cleanser 104 calculates statistical data (e.g., standard deviations, z-scores, etc.) of customer velocity parameters and a statistical threshold (e.g., a standard deviation threshold) to determine whether the receipt data 122, 124 includes statistical outliers. In such examples, the receipt data cleanser 104 also calculates statistical range data (e.g., an interquartile range) to facilitate identifying statistical outliers in the receipt data 122, 124. In some examples, the receipt data cleanser 104 performs monotonic cleansing of the receipt data 122, 124.

In some examples, to identify and account for closure of the retailer (e.g., unexpected closure, holiday closure, etc.), the receipt data cleanser 104 uses the modeling data 126 to calculate a probability or likelihood (e.g., a proportion or percentage) that one or more stores (e.g., all stores) of the retailer were open during a day (i.e., during observed business hours) in a target time interval. In such examples, the receipt data cleanser 104 performs one or more statistical tests and/or hypotheses that is/are concerned with determining the probability based on an active user base associated with the receipt data 122, 124. The receipt data cleanser 104 also calculates a probability indicative of the unexpected closure of the retailer. The projection analyzer 108 then performs a comparison of the probability to a threshold probability (e.g., 5%), which indicates whether the store(s) of the retailer were closed unexpectedly during one or more days in the target time interval. Accordingly, in some examples, the receipt data cleanser 104 removes a portion of the receipt data 122, 124 corresponding to identified day(s) during which the retailer was closed unexpectedly.

Further, in some such examples, to increase confidence in identifying unexpected closure of the retailer, the receipt data cleanser 104 calculates an observed number of receipts associated with all the stores of the same retailer as well as a threshold number of receipts. In particular, the threshold number of receipts is based on an average (e.g., a daily average) number of receipts that is typically obtained by the projection calculator 100. In such examples, the receipt data cleanser 104 compares the observed number of receipts to the threshold number of receipts to determine whether the stores of the retailer were closed unexpectedly.

In some examples, the receipt data cleanser 104 identifies and accounts for a portion of the receipt data 122, 124 that may be fraudulent. For example, customers seeking to acquire incentives from a data measurement company may intentionally provide false or fraudulent receipts or cash slips to the projection calculator 100. In such examples, for a store of the retailer, the receipt data cleanser 104 calculates a projected number of customers corresponding to a target time interval as well as a threshold number of customers. The receipt data cleanser 104 then compares the projected number of customers to the threshold number of customers, which indicates whether a portion of the receipt data 122, 124 is fraudulent and/or otherwise erroneous. In particular, in such examples, the threshold number of customers is based on an average (e.g., a daily average) number of customers that typically make purchases at the store. In some examples, the projection calculator 100 calculates the threshold number of customers to be about 5% of the average number of customers, but examples disclosed herein may consider any other threshold value(s). In other examples, the receipt data cleanser 104 analyzes one or more of store codes, register codes, operator codes, time stamps, date codes, and/or item codes (e.g., see the example receipt data 304, 306, 308, 310, 311, 312, 314, 316 in connection with FIG. 3) in the receipt data 122, 124 to similarly identify fraudulent receipts (e.g., fraudulent duplicates) provided by customers. For example, based on two or more receipts having the same item codes and/or an order of the item codes, the receipt data cleanser 104 identifies the receipts as being fraudulent.

The example user interface 112 of FIG. 1 facilitates interactions and/or communications between one or more end users and the example projection calculator 100. The user interface 112 includes one or more input devices 132 to enable the user to input information and/or data to the example projection calculator 100. For example, the input device(s) 132 of the user interface 112 may include a button, a switch, a key board, a mouse, a microphone, a camera, a touchscreen, etc. that enable(s) the user to convey data and/or commands to the example projection calculator 100.

In some examples, the user interface 112 also includes one or more output devices 134 to present information and/or data in visual and/or audible form to a user. For example, the one or more output device(s) 134 of the user interface 112 may include a light emitting diode, a touchscreen, a liquid crystal display, etc. to present visual information and/or a speaker or audio transducer to present audible information such as, for example, generated projection weights.

The user interface 112 of FIG. 1 is communicatively coupled to the network(s) 114 via the communication link(s) 120. In particular, the user interface 112 of the illustrated example receives the data 121 associated with one or more stores (e.g., stores, kiosks, mobile stores, franchise locations, etc. owned and/or otherwise managed by the same company) via the network(s) 114 and/or saves the data 121 in the memory 110.

The example memory 110 of FIG. 1 is communicatively coupled to the example receipt data analyzer 102, the example receipt data cleanser 104, the example projection analyzer 108, the example user interface 112, the example network(s) 114, the example receipt data sources 116, the example other data sources 118, and/or, more generally, the example projection calculator 100 via the example communication link(s) 120. In particular, the memory 110 stores and/or provides access to data associated with the example projection calculator 100. In some examples, the memory 110 stores and/or provides access to the data 121, (e.g., including the uncleansed receipt data 122, the cleansed receipt data 124, the observed store data 125, and/or the modeling data 126) and/or other appropriate data.

In some examples, the memory 110 is implemented by one or more storage devices and/or one or more types of storage devices such as, for example, a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). In some examples, data and/or information is stored in the memory 110 using any file and/or data structure format, organization scheme, and/or arrangement.

In some examples, the observed store data 125 includes data or information corresponding to one or more stores of a retailer such as, for example, business or operating hours (e.g., per day) of the respective stores during which customers may make purchases in-store (e.g., or at-store in the event of a kiosk), as identified by the receipt data analyzer 102. In some examples, the observed store data 125 includes a number of stores of the retailer (e.g., as determined by the receipt data analyzer 102). In some examples, the observed store data 125 includes a number of register devices at the respective stores (e.g., as determined by the receipt data analyzer 102). In some examples, the store data 125 includes types of retail register systems used by the respective stores (e.g., as determined by the receipt data analyzer 102).

In some examples, the observed store data 125 includes historical data associated with one or more stores of the retailer such as, for example, customer velocity data (e.g., rates of customer transactions that may vary over time), historical receipt data, etc.

In some examples, at least some of the data 121 is provided to the network(s) 114 and/or the projection calculator 100 via one or more example receipt data sources 116. The receipt data source(s) 116 include electronic devices (e.g., smartphones, personal computers, etc.) associated with customers that shop at one or more stores of the retailer. For example, after making a purchase in-store, a customer uses an electronic device to generate uncleansed (e.g., raw) receipt data 122 and/or otherwise divulge the purchase activity to the projection calculator 100, for example, by scanning and/or capturing an image of their receipt or cash slip resulting from the purchase.

In some examples, at least some of the data 121 is provided to the network(s) 114 and/or the projection calculator 100 via one or more consumer panels (e.g., HomeScan®, HomeScan Premium®, etc.) associated with a data measurement company. In some such examples, panelists of the consumer panel(s) may provide the data 121 to the network(s) 114 via measurement devices that monitor shopping activity of panelists.

In some examples, at least some of the data 121 is provided to the network(s) 114 and/or projection calculator 100 via one or more other data sources 118. The other data source(s) 118 of FIG. 1 include one or more stores of the retailer (e.g., via information listed on a store website), one or more census bureaus (e.g., the United States (US) Census Bureau, the Integrated European Census Microdata (IECM), etc.), one or more reliable third-party data services (e.g., Spectra®) that provide observed data associated with a geographic region, and/or one or more databases accessible via the network(s) 114. Accordingly, in such examples, the other data source(s) 118 may be communicatively coupled to the network(s) 114.

In some examples, the modeling data 126 includes one or more equations, models, algorithms, and/or methods or techniques, for example, related to calculating one or more statistical distributions (e.g., the Poisson Distribution) and/or statistical parameters (e.g., standard deviations, statistical ranges (e.g., an interquartile range), etc.). In some examples, the modeling data 126 includes one or more equations, models, algorithms, and/or methods or techniques related to performing statistical hypotheses and/or tests.

While an example manner of implementing the projection calculator 100 is illustrated in FIG. 1, one or more of the elements, processes and/or devices illustrated in FIG. 1 may be combined, divided, re-arranged, omitted, eliminated and/or implemented in any other way. Further, the example receipt data analyzer 102, the example receipt data cleanser 104, the example projection analyzer 108, the example memory 110, the example user interface 112, and/or, more generally, the example projection calculator 100 of FIG. 1 may be implemented by hardware, software, firmware and/or any combination of hardware, software and/or firmware. Thus, for example, any of the example receipt data analyzer 102, the example receipt data cleanser 104, the example projection analyzer 108, the example memory 110, the example user interface 112, and/or, more generally, the example projection calculator 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receipt data analyzer 102, the example receipt data cleanser 104, the example projection analyzer 108, the example memory 110, the example user interface 112, and/or, more generally, the example projection calculator 100 is/are hereby expressly defined to include a non-transitory computer readable storage device or storage disk such as a memory, a digital versatile disk (DVD), a compact disk (CD), a Blu-ray disk, etc. including the software and/or firmware. Further still, the example projection calculator 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIGS. 2A and 2B are block diagrams illustrating example retail register systems in accordance with disclosed examples. Turning in detail to FIG. 2A, a first example retail register system 202 (sometimes referred to as a point-of-sale (POS) system) is associated with a first example store (e.g., a grocery store, a department store, a convenience store, etc.) 204 and a first example retail register device 206 (REGISTER "A") (sometimes referred to as a cash register or till). The first register system 202 of FIG. 2A is communicatively coupled to the register device 206 to receive data from and/or provide data to the register device 206. In particular, when customers make purchases at the first store 204 via the first register 206, the register system 202 generates transaction codes that form and/or define a transaction code sequence (e.g., a monotonic sequence), for example, see one or more of the example sequences 406, 412, 418, 424 disclosed below in connection with FIGS. 4A and 4B.

While the illustrated example of FIG. 2A depicts the first store 204 having a single register device 206 associated with a single register system 202, in other examples, the first store 204 includes one or more additional register devices associated with one or more respective register systems.

In some examples, the transaction code sequence generated by the first register system 202 is monotonic. That is, each subsequent transaction code in the sequence is greater than the previous transaction code, as previously mentioned. However, in some examples, the first register system 202 resets the transaction code sequence associated therewith, for example, based on one or more of a threshold limit of the sequence, a threshold time interval (e.g., each day, each week, etc.), a change in an operator (e.g., an employee of the first store 204) of the first register device 206, etc. In this manner, the first register system 202 generates additional monotonic sequences within the transaction code sequence.

In some examples, the first register system 202 resets the transaction code sequence associated therewith, for example, based on one or more of a threshold sequence limit (e.g., a limit of 9,000 transactions, a limit of 9,999 transactions, a limit of 99,999 transactions, etc.), a threshold time interval (e.g., each day, each week, etc.), a change in an operator or cashier (e.g., a store employee) of one of the register devices 214, 216, a reset instance initiated (e.g., manually) by retailer personnel (e.g., a cashier), etc. According to the illustrated example of FIG. 2A, the projection calculator 100 identifies (e.g., via the receipt data analyzer 102) such reset instances in transaction code sequences associated with the first register system 202 and/or the first register device 206 and, in response, calculates one or more correction factors to account and/or correct for the reset instances when generating projection data for the first store 204, as discussed further below.

Turning in detail to the illustrated example of FIG. 2B, a second example retail register system 210 is associated with a second example store (e.g., a grocery store, a department store, a convenience store, etc.) 212, a second example retail register device 214 (REGISTER "B"), and a third example retail register device 216 (REGISTER "C"). The second register system 210 of FIG. 2A is communicatively coupled to the register devices 214, 216 to receive data from and/or provide data to the register devices 214, 216. In particular, when customers make purchases at the second store 212 via the second register device 214 or the third register device 216, the second register system 210 generates transaction codes that form and/or define a transaction code sequence (e.g., a monotonic sequence). Thus, the second register system 210 of FIG. 2B, unlike the first register system 202 of FIG. 2A, is responsive to customer purchases made at two or more register devices 214, 216 instead of a single register device.

As such, in some examples, the first register system 202 is considered to be a first type of retail register system and the second register system 202 is considered to be a second type of retail register system different from the first type. In such examples, receipt data provided by the first register system 202 is specific to the first store 204 (i.e., a single store) and the first register device 206 (i.e., a single register device). Similarly, in some examples, receipt data provided by the second register system 210 is specific to the second store 212, the second register device 214, and the third register device 216.

In some examples, similar to the first register system 202, the second register system 210 resets the receipt transaction code sequence for various reasons. Accordingly, in some examples, the projection calculator 100 identifies (e.g., via the receipt data analyzer 102) such reset instances associated with the second register system 210, the second register device 214, and/or the third register device 216 and, in response, calculates one or more correction factors to account and/or correct for the reset instances when generating projection data for the second store 212, as discussed further below.

While the example of FIG. 2B depicts the second store 212 having two register devices 214, 216 associated with the second register system 210, in other examples, the second store 212 includes one or more additional register devices, each of which is associated with the second register system 210.

In some examples, the first register system 202 and/or the second register system 210 generate a transaction code sequence in accordance with a particular increment pattern (e.g., integer values such as 1, 2, 3, etc.) (e.g., identified by the receipt data analyzer 102) that is based on a payment type or method (e.g., cash, credit, debit, etc.) provided by customers. For example, when a customer makes a purchase in one of stores 204, 212 via cash, the corresponding register systems 202, 210 generates a subsequent transaction code in a transaction code sequence for a receipt by a first example increment pattern (e.g., sequence increment values that increase by an integer value of 1), thereby expanding or increasing the transaction code sequence. In another example, when a customer makes a purchase via credit or debit, the register system(s) 202, 210 generate a subsequent transaction code for a receipt by a second example increment pattern (e.g., sequence increment values that increase by an integer value of 2) that, in some examples, is different from the first increment pattern. Similarly, in another example, when a customer makes a purchase via reward credits and/or or a loyalty card, the register system(s) 202, 210 generate a subsequent transaction code in a sequence for a receipt by a third example increment pattern (e.g., sequence increment values that increase by an integer value of 3) that, in some examples, is different from the first increment and/or the second increment.

In some examples, to enable calculations of projected customer activity at the first store 204 and/or the second store 212, the receipt data analyzer 102 validates receipt data provided by the respective first register system 202 and/or the second register system 214. Additionally, by validating the receipt data, the projection calculator 100 is enabled to better identify and correct for sequence characteristics of the transaction code sequences associated with the respective first register system 202 and/or the second register system 210.

In particular, the receipt data analyzer 102 identifies and/or analyzes a first transaction and a second transaction that occurred at one or more of the register devices 206, 214, 216 to identify a type of register system associated therewith and/or one or more sequence patterns implemented thereby. The first and second transactions can be coordinated and/or performed by one or more of auditors and/or panelists associated with a data measurement company to ensure desired receipt data is obtained and provided to the projection calculator 100.

In some examples, the first transaction and the second transaction are performed (e.g., by first and second auditors) at the same one of the register devices 206, 214, 216 via the same payment type or method. In such examples, the second transaction is performed immediately after the first transaction, which provides receipt data indicative of an increment between transaction codes resulting from the respective first and second transactions that is specific to the payment type. In other words, such transaction tests illustrate which type of increment pattern has been established and/or otherwise configured on the register devices 206, 214, 216.

In some examples, the first transaction is performed at the second register device 214, and the second transaction is performed at the third register device 216. In such examples, the first transaction and the second transaction are performed substantially simultaneously, which provides receipt data indicative of a type of retail register system (e.g., a type of implemented increment pattern) associated with the second and third register devices 214, 216. For instance, a transaction test in which two transactions occur within two separate register devices may reveal whether the particular store has networked the registers to increment a same transaction code sequence, or whether each register increments its own transaction code sequence in a manner independent from one or more other register devices.

In some examples, the first transaction corresponds to a final transaction that occurred during a first day (e.g., during store business hours) and the second transaction corresponds to an initial transaction that occurred during a second day (e.g., during store business hours) after the first day. In such examples, the first and second transactions provide receipt data indicative of when sequence reset instances occurred or will occur (e.g., one per day).

Accordingly, in some examples, based on a portion of the receipt data 122, 124 in the memory 110 corresponding to the respective first and second transactions, the receipt data analyzer 102 identifies the particular increment pattern(s) (e.g., 1, 2, 3, etc.) by which the register system(s) 202, 210 and/or the register device(s) 206, 214, 218 generate(s) transaction code sequences for receipts or cash slips. In some examples, based on the portion of the receipt data 122, 124, the receipt data analyzer 102 determines a type (e.g., an increment pattern type) of first register system 202 and/or the second register system 210. In some examples, based on the portion of the receipt data 122, 124, the receipt data analyzer 102 determines when a transaction code sequence will or is likely to reset.

FIG. 3 illustrates an example receipt 300 (sometimes referred to as a cash slip) in accordance with the teachings of this disclosure. In some examples, the receipt 300 of FIG. 3 is generated by the first register device 206, the second register device 214, or the third register device 216 based on a first customer making a purchase in one of the respective stores 204, 212. In particular, the receipt 300 includes receipt data 302 (e.g., stored in the memory 110 after an OCR process) generated by the first register system 202 or the second register system 210 that is indicative of customer activity associated with the respective register device 206, 214, 216 and/or the respective store 204, 212 at which the purchase was made. While the illustrated example of FIG. 3 includes the receipt 300, examples disclosed herein are applicable to any number of receipts generated by any number of register devices.

In some examples, the receipt data 302 includes one or more of an example store code 304 (ST #0101), an example register code 306 (REG #02), an example operator code 308 (OP #00023), an example transaction code or count (e.g., a sequence/transaction count value) 310 (TR #08022), one or more example item codes 311 (ITEM 1, ITEM 2, ITEM 3) (three of which are shown in this example), an example payment code 312 (CASH), and example date 314 (11/21/2017), and/or an example timestamp 316 (16:24:55). The example data 304, 306, 308, 310, 311, 312, 314, 316 of FIG. 3 represents numeric, alphabetic, or alphanumeric characters that is interpreted and/or utilized by the projection calculator 100.

In some examples, the receipt data analyzer 102 identifies a specific store of a retailer and/or how many stores the retailer has based on the store code 304. In some examples, the receipt data analyzer 102 identifies a specific register device of a store and/or how many register devices the store has based on the register code 306. In some examples, the receipt data analyzer 102 identifies a payment type (e.g., cash, credit, debit, etc.) that was used by the customer at the point of sale based on the payment code 312.

In some examples, a customer provides the receipt 300 and/or at least some of the receipt data 302, 304, 306, 308, 310, 311, 312, 314, 316 thereon to the projection calculator 100, for example, via an electronic device (e.g., a smartphone, a camera, a personal computer, etc.). For example, the customer captures an image of the receipt 300 using the electronic device and transmits the image to the projection calculator 100 via the electronic device. In some examples, the electronic device processes the image to convert the image into one or more of the respective characters.

FIGS. 4A and 4B show an example first graph 400 and an example second graph 401 (e.g., generated by the example projection calculator 100), each of which illustrates example portions of the receipt data 122, 124 in the memory 110 (e.g., processed by the receipt data analyzer 102).

In the illustrated examples of FIGS. 4A and 4B, each of the graphs 400, 401 includes a horizontal axis 402 that corresponds to time (represented as weeks in this example). Each of the graphs 400 also includes a vertical axis 404 that corresponds to quantity values of receipt transaction codes (e.g., identified by the receipt data analyzer 102).

Turning in detail to FIG. 4A, the first graph 400 includes a first example transaction code sequence (e.g., a monotonic sequence) 406 (as represented by the solid line in FIG. 4A) that characterizes purchase activity of one or more stores (e.g., the first store 204 and/or the second store 212) of a retailer over time. As shown in the illustrated example of FIG. 4A, the example receipt data analyzer 102 sorted the portion of the receipt data 122, 124 based on date and time, but examples disclosed herein are not limited thereto. For example, the receipt data analyzer 102 may sort based on received sequence code values, particularly in circumstances where timestamp granularity is insufficient (e.g., resolutions of minutes without seconds). Stated differently, in the event two or more receipts include timestamp data that is identical and/or otherwise substantially similar, sorting may be performed by the example receipt data analyzer 102 based on the associated sequential code value(s). The first transaction code sequence 406 of FIG. 4A is based on receipt data of receipts or cash slips (e.g., see the receipt data 302 of the receipt 300) such as a portion of the receipt data 122, 124 in the memory 110.

In particular, the first transaction code sequence 406 of FIG. 4A is defined between and/or formed by data points 408, 410 (i.e., a first data point 408 and a second data point 410) that correspond to respective receipts or cash slips, twelve of which are shown in this example. The first data point 408 of FIG. 4A corresponds to the beginning of the first transaction code sequence 406 and the second data point 410 corresponds to the end of the first sequence 406. In other examples, the first transaction code sequence 406 has additional, fewer, and/or different data points.

As shown in the illustrated example of FIG. 4A, the first graph 400 includes a second example sequence (e.g., a monotonic sequence) 412 (as represented by the solid line in FIG. 4A) that similarly characterizes purchase activity of the same one or more stores of the retailer. In some examples, the first transaction code sequence 406 and the second transaction code sequence 412 are considered to be a single transaction code sequence (e.g., a non-monotonic sequence) generated by a single retail register system.

The second transaction code sequence 412 of FIG. 4A is similarly based on the receipt data 122, 124 and defined between data points 414, 416 (i.e., a third data point 414 and a fourth data point 416) that correspond to respective receipts or cash slips, twelve of which are shown in this example. The third data point 414 of FIG. 4A corresponds to the beginning of the second transaction code sequence 412 and the fourth data point 416 corresponds to the end of the second transaction code sequence 412. In other examples, the second transaction code sequence 412 has additional, fewer, and/or different data points.

In some examples, the receipt data analyzer 102 identifies one or more of the data points (e.g., including one or more of the data points 408, 410, 414, 416) of the first transaction code sequence 406 and/or the second transaction code sequence 412 based on the receipt data 122, 124 in the memory 110. For example, the first data point 408 corresponds to the receipt 300 and/or is based on one or more of the store code 304, the register code 306, the operator code 308, and/or the transaction code or count 310 of the receipt 300.

Turning in detail to FIG. 4B, the second graph 401 includes a third example transaction code sequence (e.g., a monotonic sequence) 418 (as represented by the solid lines in FIG. 4B) that characterizes purchase activity over time for one or more stores (e.g., the second store 212) of a retailer. The third transaction code sequence 418 of FIG. 4B is based on the receipt data 122, 124 in the memory 110 and defined between data points 420, 422 (i.e., a fifth data point 420 and a sixth data point 422) that correspond to respective receipts or cash slips, twenty-four of which are shown in this example. In other examples, the third transaction code sequence 418 has additional, fewer, and/or different data points.

As shown in the illustrated example of FIG. 4B, the second graph 401 includes a fourth example transaction code sequence (e.g., a monotonic sequence) 424 (as represented by the solid line in FIG. 4A) that similarly characterizes purchase activity of the same one or more stores of the retailer. In some examples, the third transaction code sequence 418 and the fourth transaction code sequence 424 are considered to be a single transaction code sequence (e.g., a non-monotonic sequence) generated by a single retail register system.

The fourth transaction code sequence 424 of FIG. 4B is similarly based on the receipt data 122, 124 and defined between data points 426, 428 (e.g., a seventh data point 426 and an eighth data point 428) that correspond to respective receipts or cash slips, nine of which are shown in this example. In other examples, the fourth transaction code sequence 424 has additional, fewer, and/or different data points.

In some examples, the receipt data analyzer 102 identifies one or more of the data points (e.g., including one or more of the data points 420, 422, 426, 428, 434) of the transaction code third sequence 418 and/or the fourth transaction code sequence 424 based on the receipt data 122, 124 in the memory 110.

As shown in the illustrated example of FIG. 4B, the receipt data analyzer 102 sorted the portion of the receipt data 122, 124 based on date and time.

As will be discussed in greater detail below in connection with FIGS. 5-15, in some examples, the projection calculator 100 of FIG. 1 processes the receipt data 122, 124 in the memory 110 that is associated one or more of the example sequences 406, 412, 418, 424 (and/or one or more other transaction code sequences) to determine a corrected transaction count (for a retailer) that occurred or will occur during a target time interval.

For example, based on at least a portion of the second transaction code sequence 412 (e.g., the fourth data point 416 and a ninth data point 430) that is within and/or proximate to a first example target time interval 432, the projection analyzer 108 interpolates and/or extrapolates a projected number of customers (e.g., a transaction count) that made or likely made a purchase at the first store 204 during the first target time interval 432.

In another example, based on a portion of the third transaction code sequence 418 (e.g., a tenth data point 434 and/or the sixth data point 422) and a portion of the fourth transaction code sequence 424 (e.g., the eighth data point 428 and/or the seventh data point 426) that is within a second example target time interval 436, the projection analyzer 108 interpolates and/or extrapolates a projected number of customers (e.g., a transaction count) that made or likely made a purchase at the second store 212 during the second target time interval 436.

In the examples of FIGS. 4A and 4B, the receipt data cleanser 104 identifies the first transaction code sequence 406, the second transaction code sequence 412, the third transaction code sequence 418, and the fourth transaction code sequence 424 as being monotonic sequences. Stated differently, based on a portion of the receipt data 122, 124 corresponding to the transaction code sequences 406, 412, 418, 424, the receipt data cleanser 104 identifies four monotonic sequences. In some examples, a monotonic sequence is initially identified when a first data point has a first value (e.g., 7,551) that is greater than a subsequent data point (e.g., subsequent in time, immediately adjacent, approximately adjacent, etc.) that has a relatively lower second value (e.g., 566), thereby suggesting a transaction counter associated with the register of interest has reset. However, examples disclosed herein perform additional monotonic confirmation verification to identify circumstances where a monotonic sequence has been incorrectly identified (e.g., due to an erroneous data point caused by, for example, OCR errors). To illustrate, an OCR error may have omitted the character "7" from the subsequent data point "566," which suggests that a reset has occurred. Absent that OCR error, the example subsequent data point would have been correctly represented as "7,566" and no break in the monotonic sequence would have been identified. In such examples, the receipt data cleaner 104 removes one or more of the data points (e.g., see unfilled circles of FIGS. 4A and 4B, which include data points 408, 410, 414, 416, 420, 422, 426, 428, 430, 434) associated with the respective transaction code sequences 406, 412, 418, 424. In the event one or more of the data points is reduced (e.g., because it is erroneous), then the number of monotonic sequences is reduced (e.g., from four monotonic sequences to three monotonic sequences), as described in further detail below. Such data points are considered to be erroneous and/or unreliable for generating projection data for the retailer.

In another example, after performing monotonic cleansing of the receipt data 122, 124, the receipt data cleanser 104 identifies the third data point 414 as being erroneous. In particular, when the third data point 414 is removed from the second transaction code sequence 412, the first transaction code sequence 406 and the second transaction code sequence 412 become a single monotonic sequence 450. As used herein, transaction values that change from a sequence of increasing value(s) to a decreasing value are candidate pivot transaction code values. In the illustrated example of FIG. 4A, the third data point 414 is a candidate pivot transaction code value because a number of data points prior include an increasing transaction value sequence (unlike the example third data point 414). Of course, in some examples a candidate pivot transaction code value (e.g., the third data point 414) is erroneous due to, for example, OCR read errors that identify a transaction code value less than a real transaction code value. As discussed in further detail below, the candidate pivot transaction code value is tested to confirm whether it is a true change in direction or an anomalous data point. Further, in some such examples, the receipt data cleanser 104 only cleanses a portion of the receipt data 122, 124 that is within and/or corresponds to a time interval of interest 442 during which the transaction code sequence(s) 406, 412 reset or likely reset only once.

In some examples, the projection calculator 100 processes and/or analyzes the receipt data 122, 124 corresponding to the one more of the transaction code sequences 406, 412, 418, 424 to identify one or more sequence reset instances. For example, the receipt data analyzer 102 identifies a first sequence reset instance 438 of FIG. 4B that is based on a difference between receipt data corresponding to the data sixth data point 422 and receipt data corresponding to the seventh data point 426. Further, based on the data points 422, 426, the receipt data analyzer 102 identifies and/or determines an example sequence limit value 444 associated with a retail register system associated with the third sequence 418 and the fourth sequence 424, which is about 100,000 in this example.

In some examples, the receipt data cleanser 104 identifies one or more transaction count direction changes based on differences between adjacent receipt transaction codes. For example, while the receipt data cleanser 104 detects that a data point 409 and the data point 410 exhibit increasing transaction count values, the receipt data cleanser 104 detects that the second data point 410 and the third data point 414 exhibit a first transaction count direction change (e.g., an example pivot transaction code value showing an instance of decreasing transaction count values. Examples disclosed herein verify instances of decreasing transaction count values to determine whether a reset has occurred, or whether a data point is to be considered anomalous. In another example, based on the sixth data point 422 and the seventh data point 426, the receipt data cleanser 104 detects a second transaction count direction change. Similarly, examples disclosed herein verify whether the example direction change is indicative of a break in a monotonic sequence or a data point anomaly, thereby improving data accuracy and/or otherwise removing erroneous data points from consideration.

In the illustrated example of FIG. 4A, the receipt data cleanser 104 compares one or more monotonic threshold values to pairs of temporally adjacent point values, which enables identification of sequence reset instances. For example, the receipt data cleanser 104 compares a first monotonic difference value 452 of a first pair of temporally adjacent data points 410, 414 to a threshold value. In the event the first monotonic difference value 452 does not satisfy (e.g., exceed) the threshold value, then a reset has not occurred and any intermediate data point(s) (e.g., point 414) is deemed erroneous. Such erroneous data points are removed so that the monotonic sequence is deemed to continue. Stated differently, the example sequence 406 and the example sequence 412 are not properly deemed separate monotonic sequences, but rather a single monotonic sequence when the erroneous intermediate data point 414 is removed. Similarly, the illustrated example of FIG. 4B, the projection calculator 100 compares a second monotonic difference value 454 to a second pair of temporally adjacent data points 422, 426.

In particular, if the receipt data cleanser 104 determines that at least one pair of temporally adjacent data points satisfies a monotonic threshold percentage difference, the receipt data cleanser confirms that a reset occurred in one or more transaction code sequences in the receipt data 122, 124. For example, the receipt data cleanser 104 confirms that the second reset instance 438 occurred in the example transaction code sequence(s) 418, 424. Otherwise, in some examples, the receipt data cleanser 104 confirms one or more erroneous data points and removes the data point(s) (e.g., deletes the data point(s) in the memory 110) to preserve monotonic sequences of transaction codes in the receipt data 122, 124. As described in the example above, the receipt data cleanser 104 confirms that the third data point 414 is erroneous and removes the third data point 414 to preserve the example monotonic sequence 450 of transaction codes. Stated differently, two monotonic sequences 406, 412 of transaction codes become a single monotonic sequence 450 of transaction codes as a result of removing the third data point 414.

To initially determine a reset instance and/or a monotonic threshold percent difference in this manner, a sampling rate of receipt data corresponding to a register device and/or a register system is sufficiently high (e.g., satisfying a Nyquist rate) such that the reset instance is easily identifiable with confidence. After a transaction count reset value has initially been determined for a register of interest, if future sampling rates of the register or store are reduced, the receipt data cleanser 104 can identify future reset instances associated with the same register device and/or register system based on this established reset value. In other words, retail premises receipt acquisition rates and quantities do not need to occur as frequently to identify when a reset has occurred.

In some examples, the projection calculator 100 processes and/or analyzes the receipt data 122, 124 to identify stores of interest and/or register devices of interest that have insufficient and/or inconsistent data associated therewith. For example, the receipt data analyzer 102 determines that the first store 204 and/or the first register device 206 has/have insufficient receipt data associated therewith based on a single data point 416 corresponding to the first target time interval 432. As such, the projection analyzer 108 calculates a correction factor based on the ninth data point 430 to aid in generating projection data for the first store 204. In other words, the single data point 416 is discarded from computational consideration because a threshold number of data points (e.g., 2) did not occur within the first target time interval.

The examples of FIGS. 4A and 4B depict certain data examples disclosed herein advantageously utilize one or more other data points and/or one or more other transaction code sequences in addition or alternatively to the example data points 408, 410, 414, 416, 420, 422, 426, 428, 430, 434 and/or the example sequences 406, 412, 418, 424.

Flowcharts representative of example hardware logic or machine readable instructions for implementing the projection calculator 100 of FIG. 1 is shown in FIGS. 5-14. The machine readable instructions may be a program or portion of a program for execution by a processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 5-14, many other methods of implementing the example projection calculator 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 5:
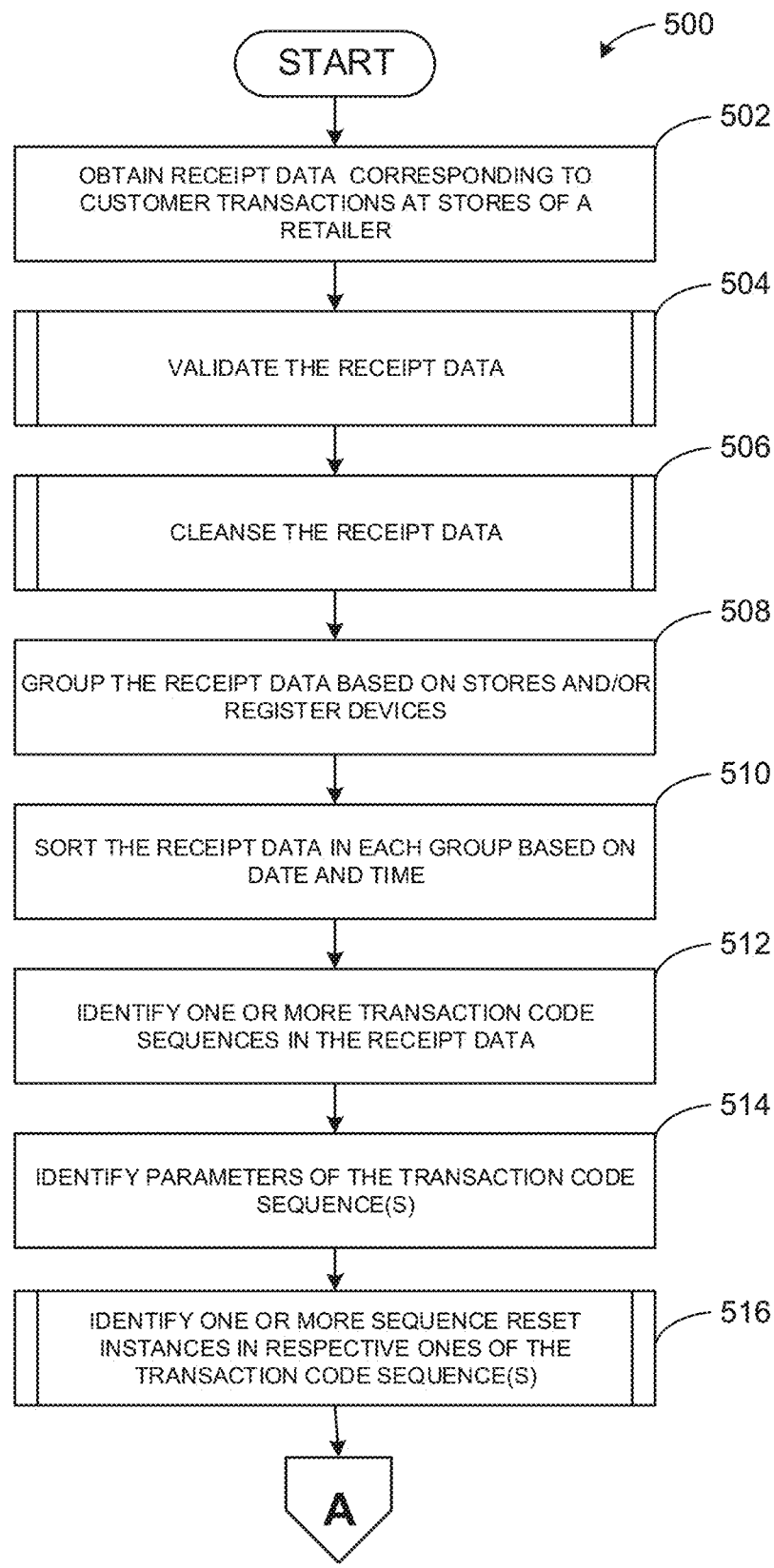
FIGS. 5 and 6 are flowcharts representative of example machine-readable instructions that may be executed to implement the example projection calculator of FIG. 1 to generate projection data for a retailer.
Figure 6:
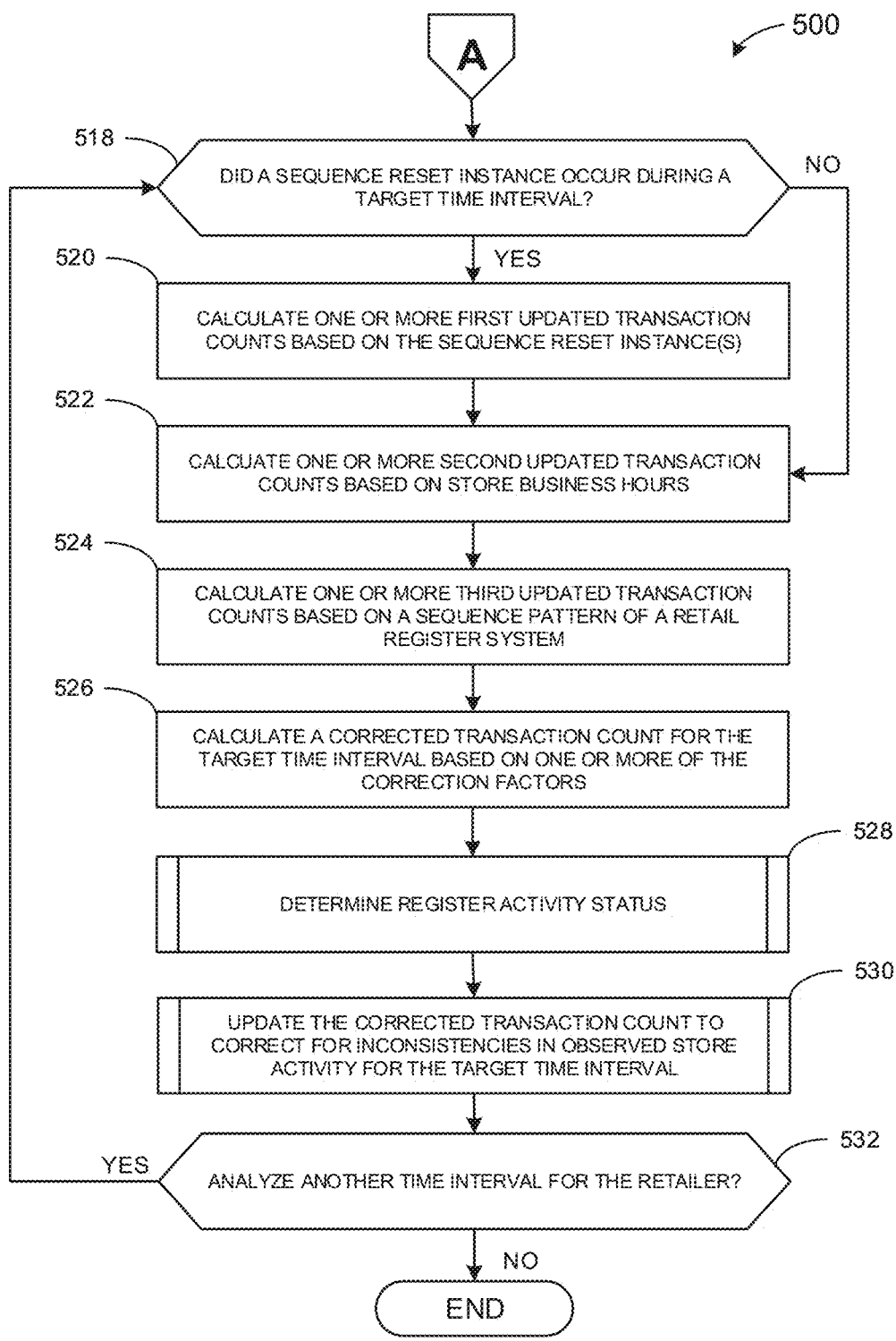

FIGS. 5 and 6 are flowcharts representative of an example program 500 that may be performed by the example projection calculator 100 of FIG. 1 to implement the examples disclosed herein. The example program 500 of FIGS. 5 and 6 may be implemented to generate projection data associated with one or more stores of a retailer, in which the projection data facilitates reduced projection errors caused by data bias (e.g., resulting from sequence patterns associated with a retail register system and/or erroneous receipt data), thereby resulting in improved projection data for clients of a data measurement company.

The example program 500 of FIG. 5 begins by obtaining receipt data corresponding to customer transactions at stores of a retailer (block 502). In some examples, the projection calculator 100 of FIG. 1 obtains (e.g., via the network(s) 114) the receipt data 122, 124 from the receipt data source(s) 116 and/or the other data source(s) 118.

The example program 500 of FIG. 5 also includes validating transaction codes of the receipt data (block 504). In some examples, the projection calculator 100 of FIG. 1 validates (e.g., via the receipt data analyzer 102) the receipt data 122, 124 to facilitate the identification of one or more patterns associated with one or more retail register devices and/or one or more retail register systems used by the stores of the retailer. Such validation is based on transactions that are particularly coordinated by store customers, which is discussed in connection with FIG. 7. For example, to determine an increment pattern associated with a register device, first and second transactions are performed at the register device that provide respective first and second receipts. In particular, the second transaction occurs immediately following the first transaction. In this manner, the first and second receipts have receipt data thereon that indicate, for example, a manner in which the register device incrementally generates a transaction count (e.g., increment by an integer value of 1) and/or an increment pattern specific to a payment type or method (e.g., increment by an integer value of 1 for cash transactions, increment by an integer value of 2 for credit card transactions, etc.).

In some examples, the projection calculator 100 validates the receipt data 122, 124 to determine a type of retail register system (e.g., the first or second type of retail register system disclosed in connection with FIGS. 2A and 2B) of the stores of the retailer. In some examples, the projection calculator 100 validates the receipt data 122, 124 to ensure that all stores of the retailer implement the same type of retail register system. In some examples, the projection calculator 100 validates the receipt data 122, 124 to determine when a retail register system is likely to reset a transaction code sequence (e.g., per day, per week, per month, in response to an employee change at the register, etc.).

The example program 500 of FIG. 5 also includes cleansing the receipt data (block 506). In some examples, the projection calculator 100 of FIG. 1 cleanses (e.g., via the receipt data cleanser 104) the uncleansed receipt data 122 in the memory 110 to remove erroneous data therefrom, thereby providing the cleansed receipt data 124 to facilitate calculations in connection with block 530. As previously mentioned, in some examples, at least some of the uncleansed receipt data 122 may be erroneous, for example, due to OCR errors, inadequate images of receipts or cash slips provided by customers, and/or fraudulent customer activity.

In some examples, the projection calculator 100 analyzes and/or processes the uncleansed receipt data 122 to remove at least some invalid receipt data (e.g., duplicates) such as, for example, an invalid store code, an invalid register code, an invalid operator code, an invalid transaction code, an invalid timestamp, and/or an invalid date. In some examples, as disclosed in greater detail below in connection with FIGS. 8-11, the projection calculator 100 cleanses the uncleansed receipt data 122 and/or further cleanses the cleansed receipt data 124 based on one or more sequence parameter and/or sequence characteristics associated with the data 122, 124, unexpected closure of the retailer, and/or fraudulent customer activity.

The example program 500 of FIG. 5 also includes grouping the receipt data based on stores and/or register devices (block 508). In some examples, the projection calculator 100 of FIG. 1 groups (e.g., via the receipt data analyzer 102) the receipt data 122, 124 based on the stores (e.g., as indicated by a store code) of the retailer and/or register devices (e.g., as indicated by a register code) of the stores. In particular, the projection calculator 100 analyzes and/or processes the receipt data 122, 124 (e.g., see the store code 304 and/or the register code 306 of the receipt 300) to determine a store and/or a register device from which the receipt data 122, 124 was generated and, in response, groups the receipt data 122, 124 accordingly. Stated differently, the example projection calculator 100 of FIG. 1 groups data from one or more stores/retailers associated with a particular geography of interest (e.g., a neighborhood, a city, a region, etc.).

The example program 500 of FIG. 5 also includes sorting (e.g., temporal sorting) the receipt data in each group based on date and time (block 510). In some examples, the projection calculator 100 of FIG. 1 sorts (e.g., via the receipt data analyzer 102) the receipt data 122, 124 in each group based on dates (e.g., indicated by a date code) and time (e.g., as indicated by a timestamp). In particular, the projection calculator 100 analyzes and/or processes the receipt data 122, 124 to determine when the receipt data 122, 124 was generated (e.g., see the date code 314 and/or the timestamp 316 of the receipt 300) and, in response, sorts the receipt data 122, 124 accordingly (e.g., see the first graph 400 and/or the second graph 401 depicted in connection with FIGS. 4A and 4B). Additionally or alternatively, in the event two or more receipts cannot be distinguished based on a temporal indication, such as when a timestamp granularity is in minutes without associated seconds data, the example receipt data analyzer 102 sorts the two or more receipts based on associated sequential code value(s).

The example program 500 of FIG. 5 also includes identifying one or more transaction code sequences in the receipt data (block 512). In some examples, the projection calculator 100 of FIG. 1 identifies (e.g., via the receipt data analyzer 102) one or more transaction code sequences (e.g., monotonic sequences) defined and/or formed by the receipt data 122, 124 in each of the groups discussed in connection with block 508. For example, the projection calculator 100 analyzes and/or processes the receipt data 122, 124 to identify one or more of the first transaction code sequence 406, the second transaction code sequence 412, the third transaction code sequence 418, and/or the fourth transaction code sequence 424 depicted in connection with FIGS. 4A and 4B. As described above, the example receipt data analyzer 102 compares each data point to a temporally subsequent data point and, if a corresponding transaction count value is increasing, the receipt data analyzer 102 identifies a corresponding set of data points as monotonic.

The example program 500 of FIG. 5 also includes identifying parameters of the transaction code sequence(s) (block 514). In some examples, the projection calculator 100 of FIG. 1 identifies (e.g., via the receipt data analyzer 102) one or more parameters associated with the transaction code sequences in connection with block 512.

In some examples, the projection calculator 100 identifies one or more of the data points (e.g., including the data points 408, 409, 410, 414, 416, 420, 422, 426, 428, 430, 434) associated with respective ones of the transaction code sequences 406, 412, 418, 424. In particular, the projection calculator 100 identifies one or more of a sequence start or beginning (e.g., see one or more of the first data point 408, the third data point 414, and/or the seventh data point 426), a sequence end (e.g., see one or more of the second data point 410, the example fourth data point 416, the example sixth data point 422, and/or the example eighth data point 428), and/or a sequence length. In some examples, the projection calculator 100 calculates a customer velocity based on differences between timestamps and transaction count values, which can vary along a transaction code sequence. Such sequence parameters facilitate calculations performed by the projection calculator 100 in connection with block 530.

The example program 500 of FIG. 5 also includes identifying one or more sequence reset instances (e.g., breaks in a monotonic sequence) in respective ones of the transaction code sequences (block 516). In some examples, the projection calculator 100 of FIG. 1 identifies (e.g., via the receipt data analyzer 102) the first sequence reset instance 438, for example, based on at least some of the receipt data 122, 124 (e.g., the sixth data point 422 and the seventh data point 426) associated with the example transaction code sequence(s) 418, 424. In some examples, the projection calculator 100 identifies the second sequence reset instance 440, for example, based on the example particular sequence limit 444 associated with a register system that provided the example transaction code sequence(s) 406, 412. In other examples, the projection calculator 100 similarly identifies one or more other transaction code sequences that are associated with the stores of the retailer.

The example program 500 of FIG. 6 also includes determining whether a sequence reset instance occurred during a target time interval (block 518). In particular, a portion of the receipt data 122, 124 corresponding to the target time interval is used in calculating projection data for the retailer in connection with block 530. As such, sequence reset instances occurring in the portion of the receipt data 122, 124 may skew the projection data if left unaccounted for and/or uncorrected. In some examples, if the projection calculator 100 determines that one or more sequence reset instances occurred during the first target time interval 432 or the second target time interval 436 (block 518: YES) (e.g., based on the first reset instance 438 being within the second target time interval 436 depicted in connection with FIG. 4B), control of the example method 500 proceeds to block 520. Otherwise, in some examples, if the sequence reset instance occurred outside of the first target time interval 432 or the second target time interval 436 (block 518: NO) (e.g., based the first reset instance 440 being external to the first target time interval 432 depicted in connection with FIG. 4A), control of the example method 500 proceeds to block 522.

The example program 500 of FIG. 6 also includes calculating one or more first updated transaction counts (or first correction factors) based on the sequence reset instance(s) (block 520). As previously disclosed, updated transaction count values (e.g., correction factors) are calculated and utilized by the projection calculator 100 to prevent projection data for the retailer from being skewed and/or otherwise correct/reduce projection errors associated with retailer sales data (e.g., overestimating or underestimating a transaction count) by patterns and/or characteristics associated with retail register systems and/or devices. In some examples, the projection calculator 100 of FIG. 1 calculates (e.g., via the projection analyzer 108) one or more first updated transaction count values based on the sequence reset instance(s) in connection with block 516. For example, the projection calculator 100 calculates the first updated transaction count value based on the first sequence reset instance 438, which improves accuracy in generating projection data in connection with block 530 for the second target time interval 436. In another example, the projection calculator 100 calculates the first updated transaction count value based on the second sequence reset instance 440, which improves accuracy in generating projection data in connection with block 530 for the first target time interval 432.

In some examples, the first updated transaction count value(s) include an adjusted difference between receipt data 122, 124 associated with a sequence reset instance. For example, the projection calculator 100 calculates a difference between the sixth data point 422 (e.g., a transaction code of the sixth data point 422) and the seventh data point 426 (e.g., a transaction code of the seventh data point 426) and increments the difference by a particular value (e.g., 1, 2, 3). In some examples, an adjusted difference includes a negative increment.

The example program 500 of FIG. 6 also includes calculating one or more second updated transaction count value(s) based on store business hours (block 522). In some examples, the projection calculator 100 of FIG. 1 calculates (e.g., via the projection analyzer 108) one or more second updated transaction count value(s) based on business hours (e.g., identified by the receipt data analyzer 102) of the stores of the retailer. In particular, an example second updated transaction count value(s) includes a unit of time that accounts for closed hours of a store.

In some examples, the projection calculator 100 calculates differences and/or corrects the differences between timestamps of the receipt data 122, 124. For example, a first time stamp (e.g., 5:30 pm) occurred at the first store 204 on a first day (e.g., 11/20/2017) and a second time stamp (e.g., 4:30 pm) occurred at the first store 204 on a second day (e.g., 11/21/2017) following the first day. In this example, without an example second updated transaction count value, a difference between time stamps is considered to be about 23 hours. However, the first store 204 closes regularly during a time interval (e.g., from 10:00 pm to 8:00 am) that is outside of business hours of the first store 204. As such, in this example, the second updated transaction count value corresponds to a unit of time based on the time interval, which is about 10 hours in this example. Thus, when the second updated transaction count value(s) (e.g., about 10 hours) is/are applied to the difference between time stamps (e.g., about 23 hours) by the projection calculator 100, the project system determines a corrected difference of time (e.g., 13 hours).

The example program 500 of FIG. 6 also includes calculating one or more third updated transaction count value(s) based on a sequence pattern of a retail register system (block 524). In some examples, the projection calculator 100 of FIG. 1 calculates (e.g., via the projection analyzer 108) one or more third updated transaction count value(s) based on a sequence pattern (e.g., determined by the receipt data analyzer 102) that is associated with the first register system 202 and/or the second register system 212, which correct for payment types or methods used by customers at one or more of the first store 204, the second store 212, etc. of the retailer. In particular, based on payment codes (e.g., "CASH," "CREDIT," "DEBIT," etc.) in the receipt data 122, 124, the projection calculator 100 calculates a ratio or proportion of customers that used or likely a certain payment type (e.g., credit) in making purchases during the first target time interval 432 and/or the second target time interval 436. As such, an example third updated transaction count value includes an integer value representing an overestimated quantity of customer transactions.

For example, with respect to a single store and/or register device, the projection calculator 100 determines that ten (10) receipts correspond to a target time interval and indicate a projected transaction count of about 1,000 (e.g., based on a difference between transaction codes of respective first and last ones of the 10 receipts). In particular, based on respective purchase codes of the 10 receipts, the projection calculator 100 determines that a proportion (e.g., 0.5) of the transactions involved a credit card purchase in which a respective retail increment pattern was 2. As a result, in this example, the projection calculator 100 determines an example third correction factor for this particular store and/or register device to be an integer value (e.g., 250) that represents a quantity of overestimated transactions. When this third correction factor is applied by the projection calculator 100, the projected transaction count for the particular store and/or register device is reduced by about 25% (e.g., from 1,000 transactions to 750 transactions). Additionally or alternatively, the projection calculator 100 determines an example third correction factor (updated transaction count value) to be a proportion (25% or 0.25) that represents an overestimated proportion of transactions. Thus, without such third correction factors, the transaction count for this particular store and/or register device would be significantly overestimated and, as a result, would skew the projection data for the retailer.

The example program 500 of FIG. 6 also includes calculating a corrected transaction count for the target time interval based on one or more of the aforementioned correction factors (block 526). In some examples, based on the receipt data 122, 124 along with one or more of the first correction factor(s) determined at block 520, the second correction factor(s) determined at block 522, and/or the third correction factor(s) determined at block 524, the projection calculator 100 of FIG. 1 calculates (e.g., via the projection analyzer 108) a corrected transaction count (e.g., total transactions or purchases made by customers) that occurred during the first target 432 time interval and/or the second target time interval 436. In this manner, one or more biases and/or errors in the receipt data 122, 124 is reduced and/or eliminated that would have otherwise adversely affected a projected transaction count for the retailer.

The example program 500 of FIG. 6 also includes updating the corrected transaction count to correct for insufficient receipt data corresponding to the target time interval, which may be based on determining a register activity status (block 528) (e.g., determining the likelihood/probability that the register was active and/or otherwise functional during one or more time periods of interest). In some examples, the projection calculator 100 of FIG. 1 updates and/or otherwise re-calculates (e.g., via the projection analyzer 108) the corrected transaction count in connection with block 526 to correct for at least a portion of the receipt data 122, 124 that is insufficient for the first target time interval (e.g., resulting from an inactive cash register and/or a cash register having less than two receipts associated therewith), which is discussed further below in connection with FIG. 12. In particular, the projection calculator 100 advantageously utilizes historical data associated with one or more of the stores of the retailer to update the corrected transaction count.

In some examples, the projection calculator 100 updates the corrected transaction count based on a portion the receipt data 122, 124 existing outside of a target time interval, but inside of an investigation time interval. For example, the projection calculator 100 updates the corrected transaction count based on the ninth data point 430 of the second transaction code sequence 412 (which is outside of the first target time interval 432, but inside the time interval of interest 442) along with the fourth data point 416 (which is inside of the first target time interval 432).

The example program 500 of FIG. 6 also includes updating the corrected transaction count to correct for inconsistencies (e.g., spikes) in observed store activity for the target time interval (block 530). In some examples, the projection calculator 100 of FIG. 1 updates and/or otherwise re-calculates (e.g., via the projection analyzer 108) the corrected transaction count in connection with block 526 to correct for inconsistencies in receipt data 122, 124 for the first target time interval 432 or the second target time interval 436, which is disclosed further below in connection with FIG. 14. In particular, the projection calculator 100 compares at least a portion of the receipt data 122, 124 to related historical trends of the retailer to update the corrected transaction count. In this manner, the projection calculator 100 improves accuracy of projection data determined in connection with block 530 by correcting for inconsistent activity associated with one or more stores and/or one or more register devices.

The example program 500 of FIG. 6 also includes determining whether to analyze another time interval for the retailer (block 532). If the projection calculator 100 of FIG. 1 determines to analyze another time interval (block 532: YES), control of the example program 500 returns to block 518. Otherwise, in some examples (block 532: NO), the example program 500 ends.

Figure 7:
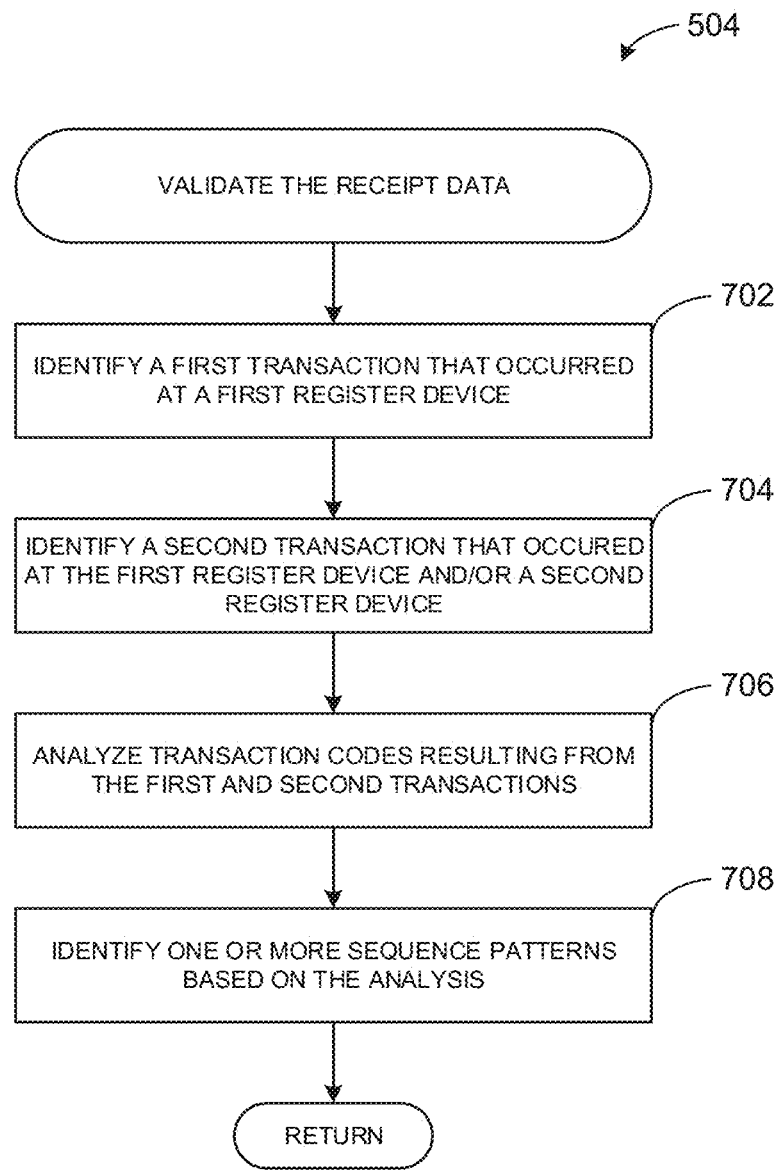
FIG. 7 is a flowchart representative of example machine-readable instructions that may be executed to implement the example projection calculator of FIG. 1 to validate retail receipt data.

FIG. 7 is a flow diagram representative of an example program 504 that may be performed by the example projection calculator 100 of FIG. 1 to validate the receipt data 122, 124. Example operations of blocks 702, 704, 706, and/or 708 may be used to implement block 504 of FIG. 5.

The example program 504 of FIG. 7 begins with the receipt data analyzer 102 identifying a first transaction that occurred at a first register device (block 702). In some examples, the projection calculator 100 of FIG. 1 identifies (e.g., via the receipt data analyzer 102) a first transaction that occurred at one or more of the register devices 206, 214, 216.

The example program 504 of FIG. 7 also includes the receipt data analyzer 102 identifying a second transaction that occurred at the first register device and/or a second register device (block 704). In some examples, the projection calculator 100 of FIG. 1 identifies (e.g., via the receipt data analyzer 102) a second transaction that occurred at one or more of the register devices 206, 214, 216. In some examples, the first transaction and the second transaction are performed at the same one of the register devices 206, 214, 216.

In some examples, the first transaction is performed at the second register device 214, and the second transaction is performed at the third register device 216. In some such examples, the first transaction and the second transaction are performed substantially simultaneously.

In some examples, the second transaction is performed after the first transaction. In some such examples, the first transaction corresponds to a final transaction that occurred during a first day (e.g., during store business hours) and the second transaction corresponds to an initial transaction that occurred during a second day (e.g., during store business hours) after the first day.

The example program 504 of FIG. 7 also includes the receipt data analyzer 102 analyzing transaction codes resulting from the first and second transactions (block 706). In some examples, the projection calculator 100 of FIG. 1 analyzes (e.g., via the receipt data analyzer 102) the transaction codes resulting from the first and second transactions discussed in connection with block 702 and 704, which indicates one or more patterns associated with and/or a type of the first retail register system 202, the second retail register system 210, and/or one or more other register systems associated with the stores of the retailer.

The example program 504 of FIG. 7 also includes the receipt data analyzer 102 identifying one or more sequence patterns based on the analysis (block 708). In some examples, based on the analysis at block 706, the projection calculator 100 of FIG. 1 identifies (e.g., via the receipt data analyzer 102) one or more sequence patterns associated with a retail register system. For example, the projection calculator 100 identifies an incremental value (e.g., 1, 2, 3, etc.) existing between the transaction codes that corresponds to a specific payment type or method (e.g., cash, credit, debit, store loyalty credits, etc.).

In some examples, after the receipt data analyzer 102 determines the incremental value (e.g., increment pattern type) at block 708, control of the example program 504 returns to a calling function such as the example program 500 of FIGS. 5 and 6.

FIG. 8 is a flow diagram representative of an example program 506 that may be performed by the example projection calculator 100 of FIG. 1 to cleanse the retail receipt data 122, 124 in the memory 110. Example operations of blocks 802, 804, 806, and/or 808 may be used to implement block 506 of FIG. 5.

The example program 506 of FIG. 8 begins with the receipt data cleanser 104 identifying one or more transaction code sequences in the receipt data (block 801). In some examples, the projection calculator 100 of FIG. 1 identifies (e.g., via the receipt data analyzer 102) one or more transaction code sequences (e.g., monotonic sequences) defined and/or formed by the receipt data 122, 124. For example, the projection calculator 100 processes the receipt data 122, 124 to identify one or more of the first transaction code sequence 406, the second transaction code sequence 412, the third transaction code sequence 418, and/or the fourth transaction code sequence 424 depicted in connection with FIGS. 4A and 4B.

The example program 506 of FIG. 8 also includes the receipt data cleanser 104 calculating velocity parameters for the receipt data based on timestamps and transaction codes or counts that are numerically increasing (block 802). In some examples, the projection calculator 100 of FIG. 1 calculates (e.g., via the receipt data cleanser 104) velocity parameters (e.g., a number of customers over time) for the receipt data 122, 124 based on timestamps and transaction codes that are numerically increasing.

In some examples, the projection calculator 100 calculates a velocity parameter for each data point (e.g., all data points including the example data points 408, 410, 414, 416, 420, 422, 426, 428, 430, 434) forming and/or defining one or more of the first sequence 406, the second sequence 412, the third sequence 418 and/or the fourth sequence 424. For example, the projection calculator 100 calculates a velocity parameter for the third data point 414 based on a difference between the receipt data 122, 124 (e.g., timestamps and transaction codes) of the respective third data point 414 and the second data point 410.

The example program 506 of FIG. 8 also includes the example receipt data cleanser 104 comparing the velocity parameters to a criterion (block 804). In some examples, the projection calculator 100 of FIG. 1 compares (e.g., via the receipt data cleanser 104) the velocity parameters of the receipt data 122, 124 provided in connection with block 802 to a threshold velocity (e.g., transactions per unit of time) (e.g., calculated by the receipt data cleanser 104). In such examples, the threshold velocity is based on the velocity parameters of the receipt data 122, 124 such as an average velocity.

In some examples, the projection calculator 100 of FIG. 1 compares statistical data (e.g., standard deviations, z-scores, etc.) of the velocity parameters to a statistical threshold (e.g., a standard deviation threshold), as calculated by the receipt data cleanser 104, to determine which ones of the velocity parameters are statistical outliers. In such examples, the projection calculator 100 calculates one or more statistical range data (e.g., an interquartile range) to facilitate identifying errors in the receipt data 122, 124.

The example program 506 of FIG. 8 also includes identifying erroneous receipt data based on the comparison (block 806). In some examples, the projection calculator 100 of FIG. 1 identifies (e.g., via the receipt data cleanser 104) at least a portion of the receipt data 122, 124 as being erroneous based on the comparison at block 804. In particular, the projection calculator 100 identifies one or more of the velocity parameters of the receipt data 122, 124 that satisfy the criterion, which indicates erroneous data.

In some examples, the projection calculator 100 identifies one or more of the velocity parameters that are outliers relative to the other ones of the velocity parameters based on the statistical data and the statistical range(s). In such examples, a velocity parameter having a standard deviation that is outside of an interquartile range (sometimes referred to as an H-spread) associated with the velocity parameters is considered to be a statistical outlier. For example, the projection calculator 100 identifies the third data point 414 as being a statistical outlier (e.g., because the example third data point 414 satisfies a threshold standard deviation in connection with a particular interquartile range) relative to the other data points (e.g., including the data points 408, 410, 414, 416, 430) associated with the first sequence 406 and/or the second sequence 412. In another example, the projection calculator 100 identifies the sixth data point 422 as being a statistical outlier relative to the other data points (e.g., including the data points 420, 426, 428, 434) associated with the third sequence 418 and/or the fourth sequence 424. In still other examples, particular interquartile range data is retrieved from historical data (e.g., from the example observed data store 125).

The example program 506 of FIG. 8 also includes the example receipt data cleanser 104 removing the erroneous receipt data from the corresponding group(s) (block 808). In some examples, the projection calculator 100 of FIG. 1 removes (e.g., via the receipt data cleanser 104) the portion of the receipt data 122, 124 (identified in connection with block 806) from respective ones of the groups (determined in connection with block 508 of FIG. 5). For example, the projection calculator 100 removes the sixth data point 414 from consideration when determining a transaction count in connection with block 530 of FIG. 6. In some examples, the projection calculator 100 deletes the portion of the receipt data 122, 124 in the memory 110 that corresponds to the third data point 414 and/or otherwise removes the portion from the memory 110. If the example third data point 414 was not identified as an outlier and/or otherwise anomalous, then the third data point 414 would cause a bias in any computations that seek to identify an accurate transaction count. Accordingly, examples disclosed herein improve the technical field of market analysis and solve the technical problem of accurately estimating retail transaction volumes with reduced bias.

In some examples, after removing the erroneous portion of the receipt data 122, 124 at block 808, control of the example program 506 returns to a calling function such as the example program 500 of FIGS. 5 and 6.

Figure 9:
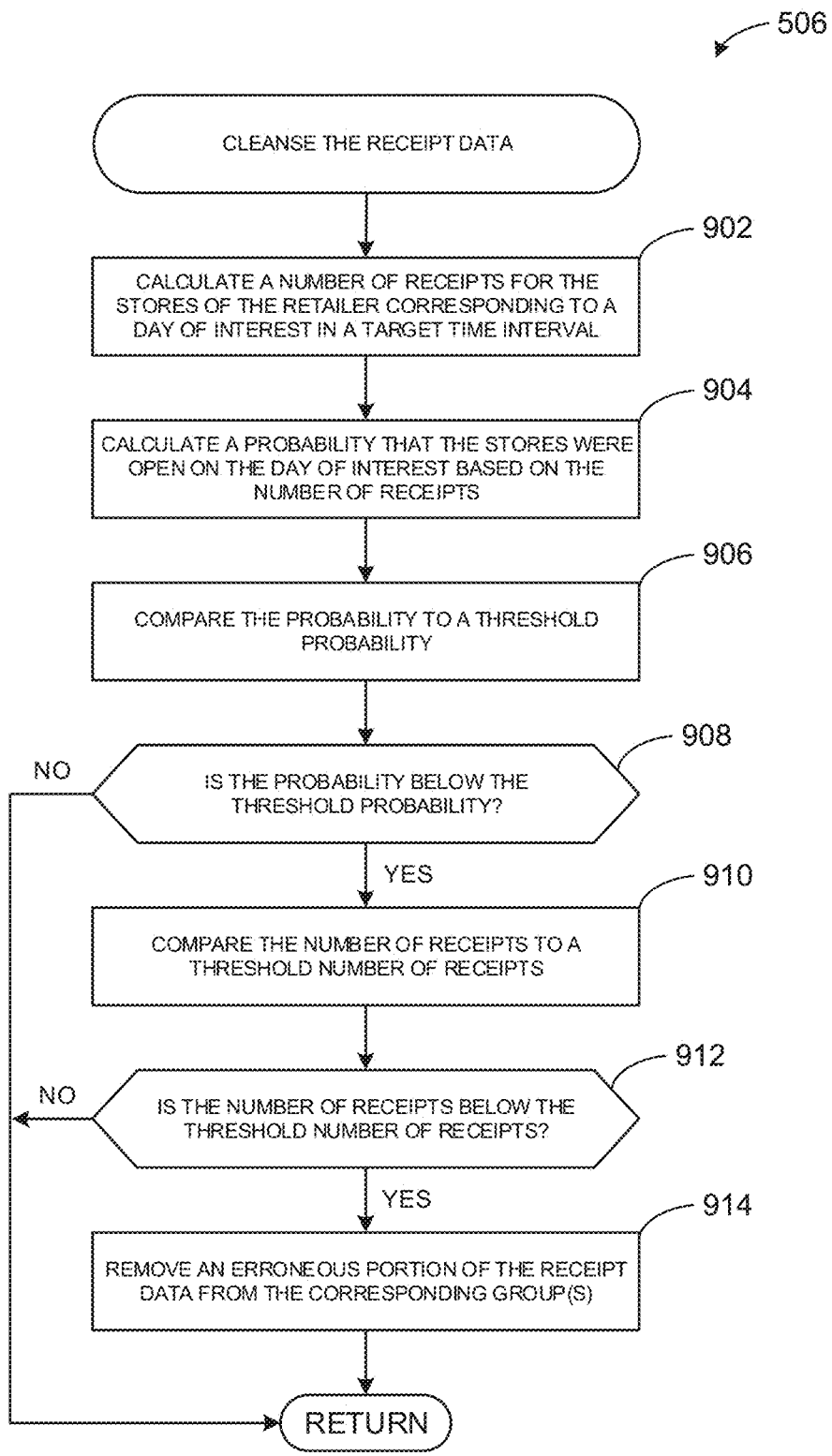

FIG. 9 is a flow diagram representative of another example program 506 that may be performed by the example projection calculator 100 of FIG. 1 to cleanse the retail receipt data 122, 124 in the memory 110. Example operations of blocks 902, 904, 906, 908, 910, 912, and/or 914 may be used to implement block 506 of FIG. 5. In particular, the example method 506 depicted in connection with FIG. 9 is effective in identifying erroneous receipt data corresponding to a day when the stores of the retailer were closed (e.g., unexpectedly due to a national holiday, a weather anomaly, etc.).

The example program 506 of FIG. 9 begins by calculating a number of receipts for the stores of the retailer corresponding to a day of interest in a target time interval (block 902). In some examples, based on the receipt data 122, 124, the projection calculator 100 of FIG. 1 calculates (e.g., via the receipt data cleanser 104) a projected or predicted number of receipts for the first store 204, the second store 212, and/or one or more other stores of the retailer that correspond to a day of interest (e.g., a weekday and/or a weekend) in the first target time interval 432 and/or the second target time interval 436.

The example program 506 of FIG. 9 also includes calculating a probability that the stores were open on the day of interest based on the number of receipts (block 904). In some examples, based on the number of receipts determined in connection with block 902, the projection calculator 100 of FIG. 1 calculates (e.g., via the receipt data cleanser 104) a probability or a likelihood (e.g., a proportion or percentage) that the first store 204, the second store 212, and/or the one or more other stores of the retailer were open during the day of interest. In such examples, the projection calculator 100 performs one or more statistical tests and/or hypotheses to determine the probability, as previously disclosed. In some examples, the projection calculator 100 retrieves and/or otherwise receives user input related to days (or hours) that a store is closed.

The example program 506 of FIG. 9 also includes comparing the probability to a threshold probability value (block 906). In some examples, the projection calculator 100 of FIG. 1 compares (e.g., via the receipt data cleanser 104) the probability determined in connection with block 904 to a threshold probability value (e.g., calculated by the receipt data cleanser 104), which indicates whether the stores of the retailer were likely closed during the day of interest.

The example program 506 of FIG. 9 also includes determining whether the probability is below the threshold probability value (block 908). In some examples, if the projection calculator 100 of FIG. 1 determines that the probability is above the threshold probability value based on the comparison at block 906 (block 908: NO), which indicates that the stores of the retailer were likely open during the day of interest, control of the example program 506 returns to a calling function such as the example method 500 of FIGS. 5 and 6. Otherwise, in some examples, if the projection calculator 100 determines that the probability is above the threshold probability based on the comparison at block 906 (block 908: YES), which indicates that the stores of the retailer were likely closed during the day of interest, control of the example program 506 proceeds to block 910.

The example program 506 of FIG. 9 also includes comparing the number of receipts to a threshold number of receipts (block 910). In some examples, the projection calculator 100 of FIG. 1 compares (e.g., via the receipt data cleanser 104) the number of receipts determined in connection with block 902 to a threshold number of receipts (e.g., calculated by the receipt data cleanser 104), which further indicates and/or increases confidence in determining whether the stores of the retailer were likely closed in terms of historical trends associated with the stores.

In particular, in some examples, the threshold number of receipts is based on an average (e.g., a daily average) number of receipts that is typically obtained by the projection calculator 100 (e.g., based on historical data).

The example program 506 of FIG. 9 also includes determining whether the number of receipts is below the threshold number of receipts (block 912). In some examples, if the projection calculator 100 of FIG. 1 determines that the number of receipts is above the threshold number of receipts based on the comparison at block 910 (block 912: NO), which indicates that the stores of the retailer were likely open during the day of interest, control of the example program 506 returns to a calling function such as the example program 500 of FIGS. 5 and 6. Otherwise, in some examples, if the projection calculator 100 determines that the number of receipts is above the threshold number of receipts based on the comparison at block 910 (block 912: YES), which indicates that the stores of the retailer were likely closed during the day of interest, control of the example program 506 proceeds to block 914.

The example program 506 of FIG. 9 also includes removing an erroneous portion of the receipt data from the corresponding group(s) (block 914). In some examples, the projection calculator 100 of FIG. 1 removes (e.g., via the receipt data cleanser 104) a portion of the receipt data 122, 124 from respective ones of the groups (determined in connection with block 508 of FIG. 5) that corresponds to the day of interest from consideration when generating projection data for the retailer in connection with block 530 of FIG. 6. In some examples, the projection calculator 100 deletes the portion of the receipt data 122, 124 in the memory 110 and/or otherwise removes the portion from the memory 110.

In some examples, after removing the erroneous receipt data 122, 124 at block 1014, control of the example program 506 returns to a calling function such as the example program 500 of FIGS. 5 and 6.

Figure 10:
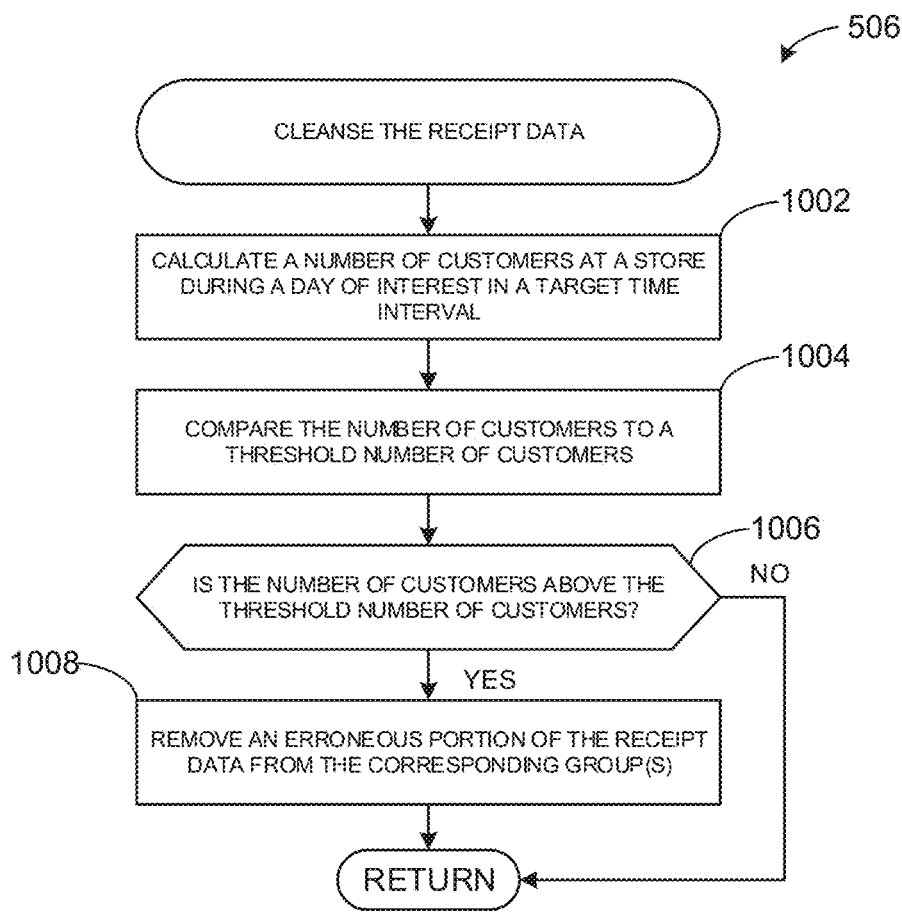

FIG. 10 is a flow diagram representative of another example program 506 that may be performed by the example projection calculator 100 of FIG. 1 to cleanse the retail receipt data 122, 124 in the memory 110. Example operations of blocks 1002, 1004, 1006, and/or 1008 may be used to implement block 506 of FIG. 5. In particular, the example program 506 depicted in connection with FIG. 10 is effective in identifying and correcting for erroneous receipt data that corresponds to fraudulent customer activity.

The example program 506 of FIG. 10 begins by calculating a number of customers at a store during a day of interest during a target time interval (block 1002). In some examples, based on the receipt data 122, 124, the projection calculator 100 of FIG. 1 calculates (e.g., via the receipt data cleanser 104) a projected or predicted number of customers that made purchases or transactions at the first store 204, the second store 212, and/or one or more other stores of the retailer during a day of interest in the first target time interval 432 and/or the second target time interval 436. In some examples, the receipt data cleanser 104 utilizes historical data to predict a typical, nominal and/or otherwise average number of customers expected during a particular day of the week, week of the year, season and/or holiday.

The example program 506 of FIG. 10 also includes the example receipt data cleanser 104 comparing the number of customers to a threshold number of customers (block 1004). In some examples, the projection calculator 100 of FIG. 1 compares (e.g., via the receipt data cleanser 104) the number of customers determined in connection with block 1002 to a threshold number of customers (e.g., calculated by the receipt data cleanser 104), which indicates whether a portion of the receipt data 122, 124 corresponding to the projected number of customers determined in connection with block 1002 is erroneous (e.g., resulting from fraudulent receipt data provided to the projection calculator 100).

In particular, in some examples, the threshold number of customers is based on an average (e.g., a daily average) number of customers that typically make purchases at respective ones of the first store 204, the second store 212, and/or the one or more other store of the retailer.

The example program 506 of FIG. 10 also includes the receipt data cleanser 104 determining whether the number of customers is above the threshold number of customers (block 1006). In some examples, if the projection calculator 100 of FIG. 1 determines that the number of customers is below the threshold number of customers based on the comparison at block 1004 (block 1006: NO), which indicates that a portion of the receipt data 122, 124 corresponding to the day of interest is not fraudulent, control of the example program 506 returns to a calling function such as the example program 500 of FIGS. 5 and 6. Otherwise, in some examples, if the projection calculator 100 determines that the number of customers is below the threshold number of customers based on the comparison at block 1004 (block 1006: YES), which indicates that the portion of the receipt data 122, 124 is fraudulent, control of the example program 506 proceeds to block 1108. Generally speaking, when the example receipt data cleanser 104 detects the number of customers exceeds the threshold, the possibility exists that fraudulent receipts have been added by one or more parties. The example receipt data cleanser 104 detects any number of potentially fraudulent receipts based on, for example, duplicative receipts having the same data printed thereon, receipts having the same purchased goods within a threshold time/date stamp, etc.

The example program 506 of FIG. 10 also includes the receipt data cleanser 104 removing an erroneous portion of the receipt data from the corresponding group(s) (block 1008). In some examples, the projection calculator 100 of FIG. 1 removes (e.g., via the receipt data cleanser 104) the portion of the receipt data 122, 124 that corresponds to the day of interest from consideration when generating projection data for the retailer in connection with block 530 of FIG. 6. In some examples, the projection calculator 100 deletes the portion of the receipt data 122, 124 in the memory 110 and/or otherwise removes the portion from the memory 110.

In some examples, after removing the erroneous receipt data 122, 124 at block 1008, control of the example program 506 returns to a calling function such as the example program 500 of FIGS. 5 and 6.

FIG. 11 is a flow diagram representative of example program 516 to identify one or more sequence reset instances in respective ones of the transaction code sequences. In the illustrated example of FIG. 11, the example receipt data analyzer 102 gathers and/or otherwise retrieves data points during a time interval of interest (e.g., time interval 442 of FIG. 4A, time interval 436 of FIG. 4B, etc.) (block 1102). The example receipt data analyzer 102 detects whether one or more of the retrieved data points exhibits a transaction count value direction change (block 1104). To illustrate, data point 414 of FIG. 4A exhibits such a direction change because the data point immediately prior (temporally) has a numerically higher value. In other words, example data point 414 represents a break in a monotonic sequence (e.g., sequence 406) preceding it. In some examples, a data point that changes direction is referred to herein as a pivot transaction code value. In some examples, the receipt data analyzer 102 considers groupings of data points (e.g., two data points, three data points, etc.) to analyze for directional change indications. For example, if the example receipt data analyzer 102 identifies a first, a second and a third data point having associated transaction count values of 980, 991 and 995, respectively, then this circumstance is indicative of a continuing progression of increasing values that are likely part of a monotonic sequence (block 1104: NO). Control advances to block 1116 where the example receipt data analyzer 102 determines whether one or more data points during the time interval of interest are to be analyzed. If so, then control returns to block 1104, otherwise the example program 516 of FIG. 11 returns to the illustrated example of FIG. 5.

Continuing with the example above, in the event the example receipt data analyzer 102 identifies a first, a second and a third data point having associated transaction count values of 980, 991 and 095, respectively, then this circumstance is indicative of a candidate/possible direction change (block 1104: YES). Stated differently, while the example first and second data points illustrate an increasing progression of values, the example third data point includes a value less than the second data point, thereby suggesting a possible direction change. The example receipt data analyzer 102 labels the data set prior to the direction change data point as a candidate/possible monotonic sequence (block 1106). However, one possibility examined by examples disclosed herein is that the third data point is erroneous (e.g., due to an OCR error). For example, an OCR error associated with the third data point may be related to a mistaken identification of the leading "0" in the value 095 when the correct value should have been a leading "9" associated with the transaction count value of 995. To improve transaction count estimation accuracy and/or otherwise reduce errors associated therewith, the example receipt data analyzer 102 selects temporally adjacent data points associated with the direction change (block 1108). Stated differently, the example program 516 expands its analysis viewpoint to determine whether the direction change instance is consistent with one or more additional data points, or whether the direction change instances is an anomalous data point.

The example receipt data analyzer 102 determines whether the temporally adjacent data points satisfy a monotonic threshold (e.g., a raw count value, a percent change value, etc.) (block 1110). Continuing with the illustrated example above, assume that the receipt data analyzer 102 acquires a temporally adjacent fourth and fifth data point having respective transaction count values of 996 and 999. Also assume that the monotonic threshold is a count value of five-hundred (500). The example receipt data analyzer 102 determines that the threshold is not satisfied in this example (block 1110: NO), which indicates that the third data point is likely erroneous. Control advances to block 1114, where the example receipt data analyzer 102 confirms the erroneous data point and removes it to preserve any monotonic sequence that was already ongoing. On the other hand, assume that the example receipt data analyzer 102 acquires a temporally adjacent fourth and fifth data point having respective transaction count values of 096 and 099. In this example, the difference between the second data point (991) and the third data point (095) satisfy (e.g., exceed) the monotonic threshold of 500. Similarly, the difference between the second data point (991) and the fourth data point (099) also satisfy (e.g., exceed) the monotonic threshold of 500 (block 1110: YES). Control advances to block 1112 where the example receipt data analyzer 102 confirms a reset has occurred.

Figure 12:
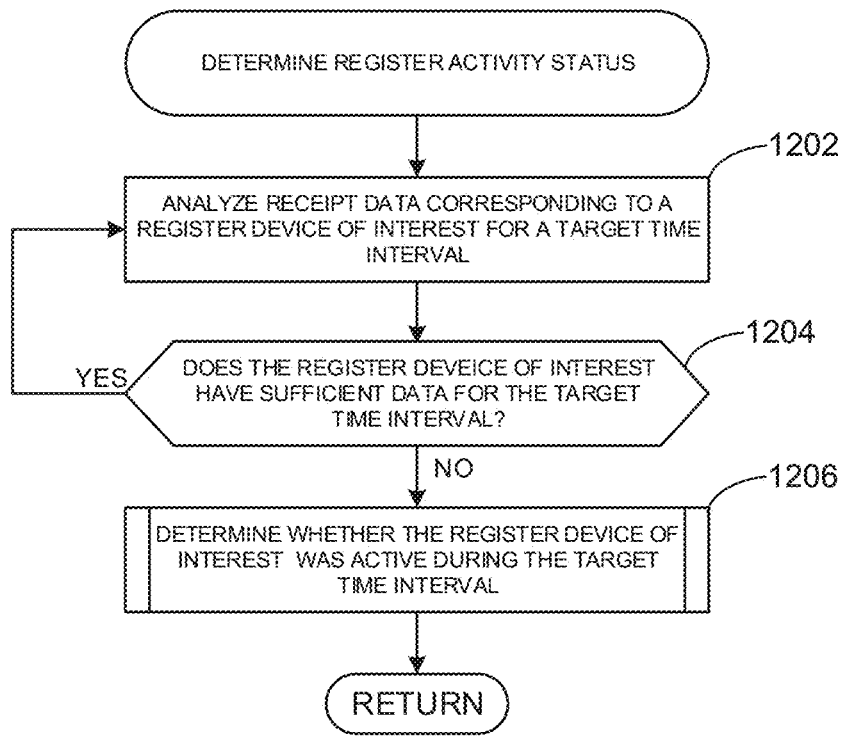
FIGS. 12-13 are flowcharts representative of example machine-readable instructions that may be executed to implement the example projection calculator of FIG. 1 to determine activity of a retail register device.

FIG. 12 is a flow diagram representative of example program 528 that may be performed by the example projection calculator 100 of FIG. 1 to calculate an update to the transaction count based on insufficient receipt data corresponding to a target time interval. Example operations of blocks 1202, 1204, 1206, 1208, 1210, 1212, and/or 1214 may be used to implement block 528 of FIG. 6. In particular, the example program 528 depicted in connection with FIG. 12 is effective in identifying and correcting for insufficient receipt data associated with one or more register devices.

The example program 528 of FIG. 12 begins by the example projection analyzer 108 analyzing receipt data corresponding to a register device of interest for a target time interval (block 1202). In some examples, the projection calculator 100 of FIG. 1 analyzes (e.g., via the projection analyzer 108) a portion of the receipt data 122, 124 corresponding to a register device of interest such one of the first register device 206, the second register device 214, the third register device 216, and/or one or more other register devices associated with the retailer. In particular, the portion of the receipt data 122, 124 corresponds to the first target time interval 432, the second target time interval 436, and/or one or more other target time intervals.

In some examples, the projection calculator 100 determines that the portion of the receipt data 122, 124 is insufficient for the first target time interval 432 based on lacking a threshold number of data points, such as only a single data point (e.g., the fourth data point 416 of the second transaction code sequence 412) corresponding to the first target time interval 432. In another example, the projection calculator 100 determines that the portion/quantity of the receipt data 122, 124 is sufficient for the second target time interval 436 based on only two data points (e.g., two or more of the example data points 422, 426, 428, 434 of the respective third and fourth transaction code sequences 418, 424) corresponding to the second target time interval 436.

The example program 528 of FIG. 12 also includes determining whether the register device of interest has sufficient data (e.g., a threshold amount of data to satisfy statistical confidence standards) for the target time interval (block 1204). In some examples, the projection calculator 100 of FIG. 1 determines (e.g., via the receipt data cleanser 104) whether the portion of the receipt data 122, 124 in connection with block 1202 is sufficient for the first target time interval 432 and/or the second target time interval 436 based on the analysis at block 1202.

In some examples, if the projection calculator 100 determines that the portion of the receipt data 122, 124 is sufficient (e.g., satisfies a threshold value) for the first or second target time interval 432, 436 (block 1204: YES), control of the example program 528 returns to a calling function such as the example program 500 of FIGS. 5 and 6. Otherwise, in some examples, if the projection calculator 100 determines that the portion of receipt data 122, 124 is insufficient for the first or second target time interval 432, 436 (block 1204: NO), control of the example program 528 proceeds to block 1206.

The example program 528 of FIG. 12 also includes determining whether the register device of interest was active during the target time interval (block 1206). In some examples, the projection calculator 100 of FIG. 1 determines (e.g., via the receipt data cleanser 104) whether register device of interest in connection with block 1202 was active during the first target time interval 432 and/or the second target time interval 436, which is disclosed further below in connection with FIG. 13. In such examples, the projection calculator 100 performs one or more statistical tests to determine whether a register device of interest was inactive during a target time interval, as previously disclosed.

Figure 13:
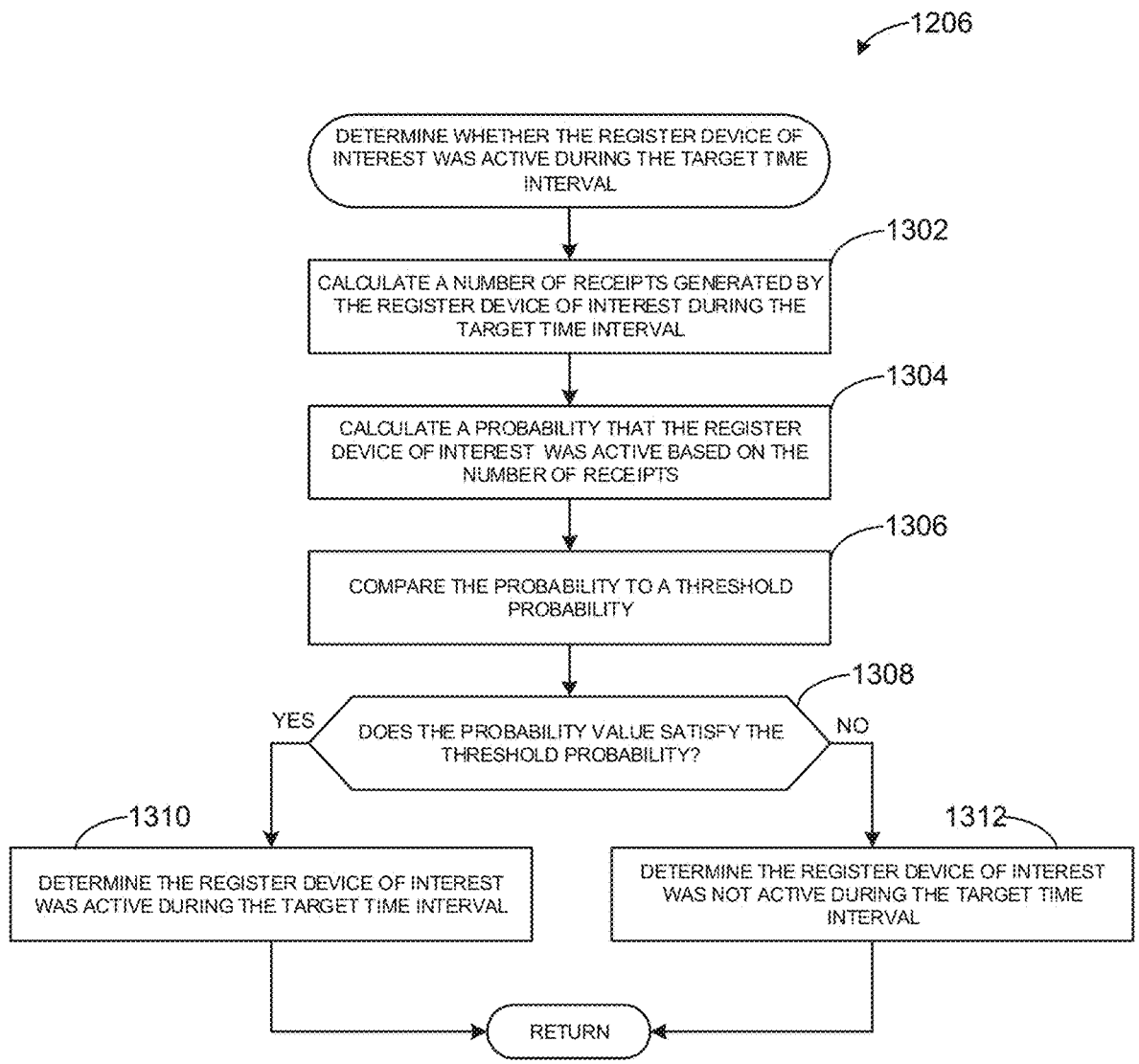

FIG. 13 is a flow diagram representative of an example program 1206 that may be performed by the example projection calculator 100 of FIG. 1 to determine whether a register device was active during a target time interval. Example operations of blocks 1302, 1304, 1306, 1308, 1310, 1312, 1314, and/or 1316 may be used to implement block 1206 of FIG. 12.

The example program 1206 of FIG. 13 begins with the projection analyzer 108 calculating a number of receipts generated by the register device of interest during the target time interval (block 1302). In some examples, based on the receipt data 122, 124, the projection calculator 100 of FIG. 1 calculates (e.g., via the projection analyzer 108) a number of receipts generated by one of the register device of interest determined in connection with block 1206 of FIG. 12 that correspond to the first target time interval 432 and/or the second target time interval 436.

The example program 1206 also includes the projection analyzer 108 calculating a probability that the register device of interest was active based on the number of receipts (block 1304). In some examples, the projection calculator 100 of FIG. 1 calculates (e.g., via the projection analyzer 108) a probability or likelihood (e.g., a proportion or percentage) that the register device of interest was active based on the number of receipts determined in connection with block 1302. In particular, the projection calculator 100 performs a statistical test and/or hypothesis to determine the probability, for example, via a statistical distribution (e.g., the Poisson distribution), as previously disclosed.

The example program 1206 also includes comparing the probability to a threshold probability value (block 1306). In some examples, the projection calculator 100 of FIG. 1 compares (e.g., via the projection analyzer 108) the probability determined in connection with block 1304 to a probability threshold value (e.g., calculated by the projection analyzer 108), which indicates whether the register device of interest was inactive.

The example program 1206 also includes determining whether the probability satisfies (e.g., is above) the threshold probability value (block 1308). In some examples, if the projection calculator 100 of FIG. 1 determines that the probability is above the threshold probability value based on the comparison at block 1306 (block 1308: YES), which indicates that the register device of interest was active, control of the example program 1206 proceeds to block 1310. Otherwise, in some examples, if the projection calculator 100 determines that the probability is below the threshold probability based on the comparison at block 1306 (block 1308: NO), which indicates that the register device of interest was inactive, control of the example program 1206 proceeds to block 1312.

The example program 1206 also includes determining that the register device was active during the target time interval (block 1310). In some examples, the projection calculator 100 of FIG. 1 determines that one or more of the first register device 206, the second register device 214, the third register device 216, and/or one or more other register devices associated with the retailer was active during one of the first target time interval 432, the second target time interval 436, and/or another suitable target time interval.

The example program 1206 also includes determining that the register device was not active during the target time interval (block 1312). In some examples, the projection calculator 100 of FIG. 1 determines that one or more of the first register device 206, the second register device 214, the third register device 216, and/or one or more other register devices associated with the retailer was inactive during one of the first target time interval 432, the second target time interval 436, and/or another suitable target time interval.

After determined whether one of the register device of interest was active or inactive, control of the example program 1206 returns to a calling function such as the example program 528 of FIG. 12.

Figure 14:
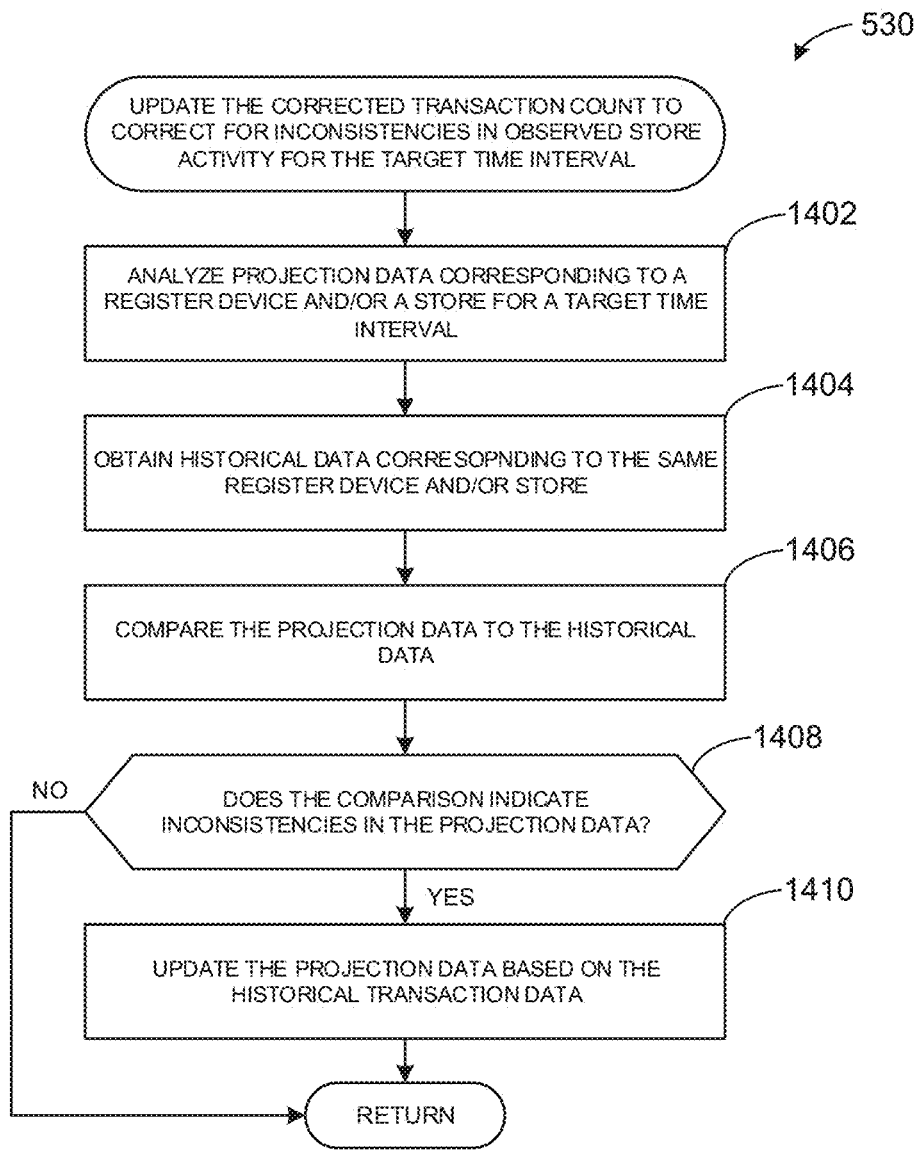
FIG. 14 is a flowchart representative of example machine-readable instructions that may be executed to implement the example projection calculator of FIG. 1 to generate projection data.

FIG. 14 is a flow diagram representative of an example program 530 that may be performed by the example projection calculator 100 of FIG. 1 to update a corrected transaction count to correct for insufficient receipt data for the target time interval. Example operations of blocks 1402, 1404, 1406, 1408, and/or 1410 may be used to implement block 530 of FIG. 6. In particular, the example program 530 depicted in connection with FIG. 14 is effective in identifying and correcting for inconsistent observed customer activity associated with one or more stores of the retailer.

The example program 530 of FIG. 14 begins by analyzing projection data corresponding to a store for a target time interval (block 1402). In some examples, the projection calculator 100 of FIG. 1 analyzes (e.g., via the projection analyzer 108) projection data corresponding to one of the first store 204, the second store 212, etc. of the retailer for one of the first target time interval 432 or the second target time interval 436 such as, for example, the corrected transaction count determined in connection with block 526 of FIG. 6. In some examples, the projection calculator 100 analyzes projection data corresponding to register devices (e.g., one or more of the example register devices 206, 214, 216) of the respective ones of the first store 204, the second store 212, etc. of the retailer.

The example program 530 of FIG. 14 also includes obtaining historical data corresponding to the same register device and/or store (block 1404). In some examples, the projection calculator 100 of FIG. 1 obtains (e.g., via the network(s) 114) historical data corresponding to same one of the stores 204, 212 and/or register devices 206, 214, 216 in connection with block 1402 such, for example, historical transaction counts.

The example program 530 of FIG. 14 also includes comparing the projection data to the historical data (block 1406). In some examples, the projection calculator 100 of FIG. 1 compares (e.g., via the projection analyzer 108) the projection data in connection with block 1402 to the historical data in connection with block 1404, which indicates whether the store(s) 204, 206 and/or register device(s) 204, 214, 216 have inconsistencies in projection data associated therewith.

The example program 530 of FIG. 14 also includes determining whether the comparison indicates inconsistencies in the projection data (block 1408). In some examples, based on the comparison at block 1406, the projection calculator 100 of FIG. 1 determines whether at least one of the stores 204, 212, etc. and/or the register devices 206, 214, 216, etc. of the retailer has projection data associated therewith that is inconsistent relative to related historical data. Inconsistencies may be determined by the example projection calculator 100 by, for example, identifying that results are larger than a threshold (e.g., expected value in view of historical data) value. In some examples, if the projection calculator 100 determines the projection data is inconsistent (block 1408: YES), control of the example program 530 of FIG. 14 proceeds to block 1410. Otherwise, in some examples, if the projection calculator 100 determines that the projection data is substantially consistent (block 1408: NO), control of the example program 530 of FIG. 14 returns to a calling function such as the example program 500 of FIG. 6.

The example program 530 of FIG. 14 also includes updating the projection data based on the historical transaction data (block 1410). In some examples, the example projection calculator 100 of FIG. 1 updates and/or otherwise re-calculates the corrected transaction count for the retailer based on historical data associated with the first store 204, the second store 212, etc.

In some examples, after updating the projection data at block 1410, control of the example program 530 of FIG. 14 returns to a calling function such as the example program 500 of FIG. 6.

Figure 15:
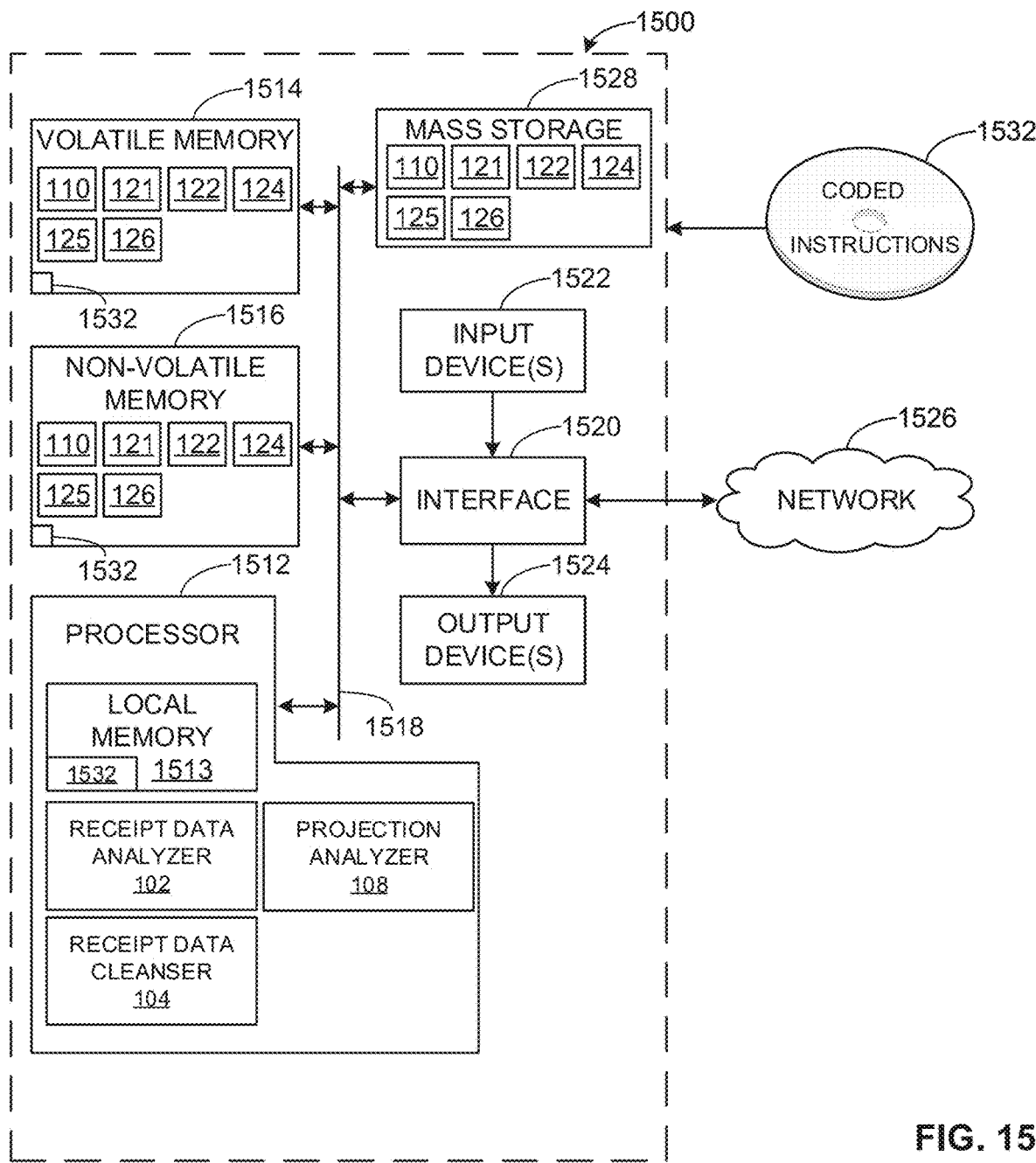
FIG. 15 is a block diagram of an example processor platform structured to execute the example machine-readable instructions of FIGS. 5-14 to implement the example projection calculator of FIG. 1.

FIG. 15 is a block diagram of an example processor platform 1500 structured to execute the instructions of FIGS. 5-14 to implement the projection calculator 100 of FIG. 1. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example receipt data analyzer 102, the example receipt data cleanser 104, and the example projection analyzer 108.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 5-14 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, systems, apparatus, and articles of manufacture have been disclosed that improve the technical field of market research and analytics by generating projection data for a retailer based on receipt data provided by register devices associated with stores of the retailer. Prior to generating the projection data, disclosed examples identify and correct for one or more patterns in the receipt data that is/are associated with one or more retail register systems. By generating the projection data in this manner, examples disclosed herein reduce and/or eliminate errors in the projection data caused by the retailer register system(s) that would have otherwise been exhibited by known projection systems. Thus, examples disclosed herein improve computational efficiency in generating the projection data by reducing and/or eliminating a need for re-calculations caused by such error(s). Further, some disclosed examples generate effective and/or accurate projection data for the retailer while using less receipt data (e.g., less memory) that would have otherwise been required by the above-described known projection system.

Example methods, systems, apparatus, and articles of manufacture to generate corrected projection data for stores are disclosed herein. Some such examples and combinations thereof include the following.

Example 1 includes an apparatus to reduce projection errors associated with retail register devices, the apparatus comprising a receipt data analyzer to retrieve transaction code values associated with receipts generated by the retail register devices, identify a direction change in a first subset of the retrieved transaction code values; and verify a register reset occurrence based on values associated with a second subset of the retrieved transaction code values. The example apparatus also includes a projection calculator to reduce retail sales projection error by calculating a transaction count based on the retrieved receipts and transaction code values. In some examples, the projection calculator is to reduce retail sales projection error by calculating a transaction count based on the register reset occurrence.

Example 2 includes the apparatus as defined in example 1, wherein the receipt data analyzer is to identify the direction change based on detecting a monotonically increasing series of the retrieved transaction code values followed by a candidate pivot transaction code value, the candidate pivot transaction code value less than values associated with the first subset of the retrieved transaction code values.

Example 3 includes the apparatus as defined in example 2, further including a receipt data cleanser to compare the candidate pivot transaction code value to a monotonic difference value.

Example 4 includes the apparatus as defined in example 3, wherein the receipt data cleanser is to identify the candidate pivot transaction code value as an erroneous data point when the monotonic difference value is not satisfied.

Example 5 includes the apparatus as defined in example 1, wherein the receipt data analyzer is to retrieve the second subset of the retrieved transaction code values temporally proximate to the first subset of the retrieved transaction code values.

Example 6 includes the apparatus as defined in example 1, further including a receipt data cleanser to calculate a difference between (a) a transaction code value associated with the direction change and (b) a transaction code value associated with one of the transaction code values of the second subset.

Example 7 includes the apparatus as defined in example 6, wherein the receipt data cleanser is to compare the difference to a monotonic threshold.

Example 8 includes the apparatus as defined in example 7, wherein the receipt data cleanser is to verify the register reset occurrence when the monotonic threshold is satisfied.

Example 9 includes a computer-implemented method to reduce projection error associated with retail register devices, the method comprising retrieving, by executing instructions with a processor, transaction code values associated with receipts generated by the retail register devices, identifying, by executing instructions with the processor, a direction change in a first subset of the retrieved transaction code values, verifying, by executing instructions with the processor, a register reset occurrence based on values associated with a second subset of the retrieved transaction code values and reducing, by executing instructions with the processor, retail sales projection error by calculating a transaction count based on the retrieved receipts and transaction code values. In some examples, the method reduces retail sales projection error by calculating a transaction count based on the register reset occurrence.

Example 10 includes the method as defined in example 9, further including identifying the direction change based on detecting a monotonically increasing series of the retrieved transaction code values followed by a candidate pivot transaction code value, the candidate pivot transaction code value less than values associated with the first subset of the retrieved transaction code values.

Example 11 includes the method as defined in example 10, further including comparing the candidate pivot transaction code value to a monotonic difference value.

Example 12 includes the method as defined in example 11, further including identifying the candidate pivot transaction code value as an erroneous data point when the monotonic difference value is not satisfied.

Example 13 includes the method as defined in example 9, further including retrieving the second subset of the retrieved transaction code values temporally proximate to the first subset of the retrieved transaction code values.

Example 14 includes the method as defined in example 9, further including calculating a difference between (a) a transaction code value associated with the direction change and (b) a transaction code value associated with one of the transaction code values of the second subset.

Example 15 includes the method as defined in example 14, further including comparing the difference to a monotonic threshold.

Example 16 includes the method as defined in example 15, further including verifying the register reset occurrence when the monotonic threshold is satisfied.

Example 17 includes at least one non-transitory computer readable storage media comprising computer readable instructions that, when executed, cause one or more processors to, at least, retrieve transaction code values associated with receipts generated by retail register devices, identify a direction change in a first subset of the retrieved transaction code values, verify a register reset occurrence based on values associated with a second subset of the retrieved transaction code values, and reduce retail sales projection error by calculating a transaction count based on the retrieved receipts and transaction code values. In some examples, the computer readable instructions, when executed, cause the one or more processors to calculate the transaction count based on the register reset occurrence.

Example 18 includes the at least one storage media as defined in example 17, wherein the computer readable instructions, when executed, cause the one or more processors to identify the direction change based on detecting a monotonically increasing series of the retrieved transaction code values followed by a candidate pivot transaction code value, the candidate pivot transaction code value less than values associated with the first subset of the retrieved transaction code values.

Example 19 includes the at least one storage media as defined in example 18, wherein the computer readable instructions, when executed, cause the one or more processors to compare the candidate pivot transaction code value to a monotonic difference value.

Example 20 includes the at least one storage media as defined in example 19, wherein the computer readable instructions, when executed, cause the one or more processors to identify the candidate pivot transaction code value as an erroneous data point when the monotonic difference value is not satisfied.

Example 21 includes the at least one storage media as defined in example 17, wherein the computer readable instructions, when executed, cause the one or more processors to retrieve the second subset of the retrieved transaction code values temporally proximate to the first subset of the retrieved transaction code values.

Example 22 includes the at least one storage media as defined in example 17, wherein the computer readable instructions, when executed, cause the one or more processors to calculate a difference between (a) a transaction code value associated with the direction change and (b) a transaction code value associated with one of the transaction code values of the second subset.

Example 23 includes the at least one storage media as defined in example 22, wherein the computer readable instructions, when executed, cause the one or more processors to compare the difference to a monotonic threshold.

Example 24 includes the at least one storage media as defined in example 23, wherein the computer readable instructions, when executed, cause the one or more processors to verify the register reset occurrence when the monotonic threshold is satisfied.

Example 25 includes a system to reduce projection errors associated with retail register devices, the system comprising means for analyzing data, the data analyzing means to retrieve transaction code values associated with receipts generated by the retail register devices, identify a direction change in a first subset of the retrieved transaction code values, and verify a register reset occurrence based on values associated with a second subset of the retrieved transaction code values, and means for calculating a projection, the projection calculating means to reduce retail sales projection error by calculating a transaction count based on the retrieved receipts and transaction code values.

Example 26 includes the system as defined in example 25, wherein the data analyzing means is to identify the direction change based on detecting a monotonically increasing series of the retrieved transaction code values followed by a candidate pivot transaction code value, the candidate pivot transaction code value less than values associated with the first subset of the retrieved transaction code values.

Example 27 includes the system as defined in example 26, further including means for receipt data cleaning, the receipt data cleaning means to compare the candidate pivot transaction code value to a monotonic difference value.

Example 28 includes the system as defined in example 27, wherein the receipt data cleaning means is to identify the candidate pivot transaction code value as an erroneous data point when the monotonic difference value is not satisfied.

Example 29 includes the system as defined in example 25, wherein the data analyzing means is to retrieve the second subset of the retrieved transaction code values temporally proximate to the first subset of the retrieved transaction code values.

Example 30 includes the system as defined in example 25, further including means for receipt data cleaning, the receipt data cleaning means to calculate a difference between (a) a transaction code value associated with the direction change and (b) a transaction code value associated with one of the transaction code values of the second subset.

Example 31 includes the system as defined in example 30, wherein the receipt data cleaning means is to compare the difference to a monotonic threshold.

Example 32 includes the system as defined in example 31, wherein the receipt data cleaning means is to verify the register reset occurrence when the monotonic threshold is satisfied.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to reduce projection errors associated with retail register devices, the apparatus comprising:
   a receipt data analyzer to:
      retrieve transaction code values associated with receipts generated by the retail register devices;
      determine a register reset occurrence based on a candidate pivot transaction code value by identifying a direction change in a first subset of the retrieved transaction code values; and
      verify the register reset occurrence based on values associated with a second subset of the retrieved transaction code values; and
   a projection calculator to:
      group retrieved receipts and the retrieved transaction code values based on a geographical location associated with each of the retail register devices; and
      reduce retail sales projection error by calculating a transaction count for the retail register devices based on the retrieved receipts and the retrieved transaction code values.

2. The apparatus as defined in claim 1, wherein the receipt data analyzer is to identify the direction change based on detecting a monotonically increasing series of the retrieved transaction code values followed by the candidate pivot transaction code value, the candidate pivot transaction code value less than values associated with the first subset of the retrieved transaction code values.

3. The apparatus as defined in claim 2, further including a receipt data cleanser to compare the candidate pivot transaction code value to a monotonic difference value.

4. The apparatus as defined in claim 3, wherein the receipt data cleanser is to identify the candidate pivot transaction code value as an erroneous data point when the monotonic difference value is not satisfied.

5. The apparatus as defined in claim 1, wherein the receipt data analyzer is to retrieve the second subset of the retrieved transaction code values temporally proximate to the first subset of the retrieved transaction code values.

6. The apparatus as defined in claim 1, further including a receipt data cleanser to calculate a difference between (a) a transaction code value associated with the direction change and (b) a transaction code value associated with one of the transaction code values of the second subset.

7. The apparatus as defined in claim 6, wherein the receipt data cleanser is to compare the difference to a monotonic threshold.

8. The apparatus as defined in claim 7, wherein the receipt data cleanser is to verify the register reset occurrence when the monotonic threshold is satisfied.

9. A computer-implemented method to reduce projection error associated with retail register devices, the method comprising:
retrieving, by executing instructions with a processor, transaction code values associated with receipts generated by the retail register devices;
identifying, by executing instructions with the processor, a direction change in a first subset of the retrieved transaction code values to determine a register reset occurrence based on a candidate pivot transaction code value;
verifying, by executing instructions with the processor, the register reset occurrence based on values associated with a second subset of the retrieved transaction code values;
grouping, by executing instructions with the processor, retrieved receipts and the retrieved transaction code values based on a geographical location associated with each of the retail register devices; and
reducing, by executing instructions with the processor, retail sales projection error by calculating a transaction count for the retail register devices based on the retrieved receipts and the retrieved transaction code values.

10. The method as defined in claim 9, further including identifying the direction change based on detecting a monotonically increasing series of the retrieved transaction code values followed by the candidate pivot transaction code value, the candidate pivot transaction code value less than values associated with the first subset of the retrieved transaction code values.

11. The method as defined in claim 10, further including comparing the candidate pivot transaction code value to a monotonic difference value.

12. The method as defined in claim 11, further including identifying the candidate pivot transaction code value as an erroneous data point when the monotonic difference value is not satisfied.

13. The method as defined in claim 9, further including retrieving the second subset of the retrieved transaction code values temporally proximate to the first subset of the retrieved transaction code values.

14. The method as defined in claim 9, further including calculating a difference between (a) a transaction code value associated with the direction change and (b) a transaction code value associated with one of the transaction code values of the second subset.

15. The method as defined in claim 14, further including comparing the difference to a monotonic threshold.

16. The method as defined in claim 15, further including verifying the register reset occurrence when the monotonic threshold is satisfied.

17. At least one non-transitory computer readable storage media comprising computer readable instructions that, when executed, cause one or more processors to, at least:
retrieve transaction code values associated with receipts generated by retail register devices;
identify a direction change in a first subset of the retrieved transaction code values to determine a register reset occurrence based on a candidate pivot transaction code value;
verify the register reset occurrence based on values associated with a second subset of the retrieved transaction code values;
group retrieved receipts and the retrieved transaction code values based on a geographical location associated with each of the retail register devices; and
reduce retail sales projection error by calculating a transaction count for the retail register devices based on the retrieved receipts and the retrieved transaction code values.

18. The at least one storage media as defined in claim 17, wherein the computer readable instructions, when executed, cause the one or more processors to identify the direction change based on detecting a monotonically increasing series of the retrieved transaction code values followed by the candidate pivot transaction code value, the candidate pivot transaction code value less than values associated with the first subset of the retrieved transaction code values.

19. The at least one storage media as defined in claim 18, wherein the computer readable instructions, when executed, cause the one or more processors to compare the candidate pivot transaction code value to a monotonic difference value.

20. The at least one storage media as defined in claim 19, wherein the computer readable instructions, when executed, cause the one or more processors to identify the candidate pivot transaction code value as an erroneous data point when the monotonic difference value is not satisfied.

21. The at least one storage media as defined in claim 17, wherein the computer readable instructions, when executed, cause the one or more processors to retrieve the second subset of the retrieved transaction code values temporally proximate to the first subset of the retrieved transaction code values.

22. The at least one storage media as defined in claim 17, wherein the computer readable instructions, when executed, cause the one or more processors to calculate a difference between (a) a transaction code value associated with the direction change and (b) a transaction code value associated with one of the transaction code values of the second subset.

23. The at least one storage media as defined in claim 22, wherein the computer readable instructions, when executed, cause the one or more processors to compare the difference to a monotonic threshold.

24. The at least one storage media as defined in claim 23, wherein the computer readable instructions, when executed, cause the one or more processors to verify the register reset occurrence when the monotonic threshold is satisfied.

* * * * *